(12) United States Patent
Henocq et al.

(10) Patent No.: US 7,423,649 B2
(45) Date of Patent: Sep. 9, 2008

(54) METHODS AND DEVICES FOR CREATING, DOWNLOADING AND MANAGING AN ANIMATION

(75) Inventors: Xavier Henocq, Acigne (FR); Franck Denoual, Saint Domineuc (FR); Hervé Ruellan, Rennes (FR); Fabrice Le Leannec, Noyal-Chatillon sur Seiche (FR)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 10/986,381

(22) Filed: Nov. 12, 2004

(65) Prior Publication Data

US 2005/0104887 A1    May 19, 2005

(30) Foreign Application Priority Data

Nov. 14, 2003 (FR) .................................. 03 13380
Nov. 28, 2003 (FR) .................................. 03 14006

(51) Int. Cl.
*G06T 13/00* (2006.01)
*G06T 15/00* (2006.01)
*G06F 15/16* (2006.01)
*G06F 15/173* (2006.01)
*G06K 9/46* (2006.01)

(52) U.S. Cl. .................. 345/473; 709/203; 709/219; 709/240; 709/247; 382/233

(58) Field of Classification Search .................. 345/473
See application file for complete search history.

(56) References Cited

U.S. PATENT DOCUMENTS

| 6,057,847 | A  | * | 5/2000  | Jenkins ........................ 345/422 |
| 6,081,278 | A  |   | 6/2000  | Chen .......................... 345/473 |
| 6,185,625 | B1 |   | 2/2001  | Tso et al. ..................... 709/247 |
| 6,442,603 | B1 |   | 8/2002  | Borella ........................ 709/218 |
| 6,442,658 | B1 |   | 8/2002  | Hunt et al. ................... 711/158 |
| 6,476,802 | B1 |   | 11/2002 | Rose et al. ................... 345/419 |
| 7,084,877 | B1 | * | 8/2006  | Panusopone et al. ........ 345/474 |
| 2001/0020943 | A1 | * | 9/2001 | Hijiri et al. ................. 345/473 |

(Continued)

FOREIGN PATENT DOCUMENTS

EP    1 274 274 A1    1/2003

(Continued)

OTHER PUBLICATIONS

Edwards, Eric; Foessel, Siegfried; "JPEG 2000 for Digital Cinema Applications;" Apr. 25, 2001, www.jpeg.org, pp. 1-25.*

(Continued)

*Primary Examiner*—Ulka Chauhan
*Assistant Examiner*—Crystal Murdoch
(74) *Attorney, Agent, or Firm*—Fitzpatrick, Cella, Harper & Scinto

(57) ABSTRACT

A method of creating an animation with a sequence of images which includes the steps of optimising requests for obtaining images from a remote terminal depending on at least one criterion, and creating a file comprising the optimised requests. For example, two computers may be employed wherein a first computer is used to submit requests which are received by the second computer. The second computer optimises the received requests in the form of animations, creates a file, and sends the corresponding data back to the first computer in digital form.

5 Claims, 18 Drawing Sheets

U.S. PATENT DOCUMENTS

| | | | |
|---|---|---|---|
| 2002/0118224 A1 | 8/2002 | Levanon et al. | 345/748 |
| 2003/0068100 A1* | 4/2003 | Covell et al. | 382/305 |
| 2004/0187124 A1 | 9/2004 | Labelle | 718/100 |
| 2005/0259877 A1* | 11/2005 | Wang et al. | 382/236 |
| 2006/0184607 A1 | 8/2006 | Le Leannec et al. | 709/203 |

OTHER PUBLICATIONS

ISO/IEC; "Information Technology: JPEG 2000 Image Coding System" Mar. 16, 2000, version N1646R, pp. 5, 59-60, 179-180.*

Taubman, David; "JPEG2000 Compression Standard for Interactive Imaging;" Mar. 27, 2003, pp. 1-35.*

Wagstaff, K. L.; Castano, R.; Klimesh, M.; Mukai, R.; "Science-Based Region-of-Interest Image Compression;" Mar. 2004, 35th Lunar and Planetary Science Conference; pp. 1-2.*

Movingpicture Quickstart Manual V4.4 (2003); XP-002282185 (http://web.archive.org/web/20030411075801/www.stagetools.com/quickstart.htm).

Taubman, D., et al., "*Architecture, Philosophy and Performance of JPIP: Internet Protocol Standard for JPEG2000,*" Visual Communications and Image Processing, Proceedings of SPIE, Bellingham, VA, USA, vol. 5150, No. 1, pp. 791-805 (2003); XP-002282186; ISSN: 0277-786X.

McCanne, S., et al., "*Low-Complexity Video Coding For Receiver-Driven Layered Multicast,*" IEEE Journal of Selected Areas in Communications, vol. 15, No. 6 (1997), pp. 983-1001.

Taubman, D., "*Proposal and Implementation of JPIP (Jpeg2000 Internet Protocol) in Kakadu v.3.3,*" XP002260543.

Houchin, J.S., et al., "*File Format Technology in JPEG 2000 Enables Flexible Use Of Still and Motion Sequences,*" Signal Processing: Image Communication, Elsevier Science Publications, Amsterdam, NL, vol. 17, No. 1 (2002), pp. 131-144, XP004326803.

"Flash MX" by Dunod.

"Coding of Still Pictures", ISO/IEC JTC 1/XC 29/WG 1 (ITU-T SG16), Oct. 24, 2002.

McCanne, S., "Low Complexity Video Coding for Receiver Driven Layered Multicast", IEEE Journal on Selected Areas in Communication, 1997.

"JPEG2000 Image Coding System", JPEG 200 Part I Final Draft International Standard, Aug. 18, 2000.

"Macromedia Flash White Paper, White Paper: Flash Player for Developers and Publishers", Source NPD Online, IDS, 2000.

Antonini, M., et al., "Image Coding Using Wavelet Transform", IEEE Transactions on Image Processing, vol. 1, No. 2, Apr. 1992.

"A Survey of Multimedia Compression Techniques and Standards, Part 1", Academic Press Limited, pp. 49-67, 1995.

Macromedia White Paper, "Developing Rich Internet Applications with Macromedia MX 2004", Aug. 2003.

* cited by examiner

| Data structure maintained by the invention: List of the problem images and different possible versions | | | | |
|---|---|---|---|---|
| Index | 0 | 12 | 18 | |
| 1st compatible class | 2 | 1 | 3 | |
| Size in bits | 32000 | 29000 | 34000 | |
| Size (hu*wu) | 240*320 | 240*320 | 240*320 | |
| Qumax | 12 | 15 | 13 | |
| Version 0: <br> Rate <br> Distortion <br> Resolution <br> Quality | 1000 <br> 384000 <br> 0 <br> 0 | 890 <br> 424000 <br> 0 <br> 0 | 928 <br> 445000 <br> 0 <br> 0 | |
| ......... | | | | |
| Version i: <br> Rate <br> Distortion <br> Resolution <br> Quality | 12400 <br> 148000 <br> 3 <br> 5 | 14000 <br> 96400 <br> 4 <br> 6 | 13780 <br> 84000 <br> 3 <br> 5 | |

METHODS AND DEVICES FOR CREATING, DOWNLOADING AND MANAGING AN ANIMATION

FIELD OF THE INVENTION

The present invention generally relates to animations, which are displayed as a sequence of fixed images.

BACKGROUND OF THE INVENTION

With the increase of their capacities, computers can manage not only fixed images but also animated images or films. It therefore becomes advantageous for a content creator to be able to integrate animations in his productions.

As he does not necessarily have videos or animated sequences corresponding to the content which he wishes to include in one of his productions available, it is important to offer him tools for presenting a fixed image dynamically. Thus, instead of directly presenting a panoramic photograph of a landscape, he will be able to make this photograph pass through a smaller frame in order to simulate the movement of a camera facing this landscape. In a similar fashion, in order to present a painting, he can firstly present an overall view of the work and then zoom in on a first interesting detail before moving the view to another detail of the work.

There already exist several software packages for producing such animations from a fixed image. For example, the MovingPicture software from StageTools makes it possible to perform this task, as explained in the MovingPicture Quick-Start manual v4.4. These software packages use two different techniques for storing the animation thus produced with a view to transmitting it to a user who will be able to look at it. The first technique consists of generating a fixed image for each frame of the sequence and then combining all these images and saving them as a film using a conventional film format, such as MPEG2 for example. A second technique consists of saving the image and all the commands necessary for recreating the animation (for example "show the complete image, zoom in on such and such a region, make a translation to such and such another region").

These two techniques each have their drawbacks, in particular for broadcasting these creations over the Internet. In the first case, the file generated is of large size, which requires a large bandwidth in order to be able to display the animation correctly. Thus a user having only a modem available will not be able to see the animation with the correct quality. In the second case, before the animation can be played, the entire image must be loaded. Thus, even if the total size of the data loaded is less than in the first case, a significant time may elapse before the user can commence displaying of the animation.

There is also known, through the published American patent application US-A-2002/0118224, a system for dynamically displaying images through a network. The client system comprises a subsystem for requesting data packets and a subsystem for displaying data packets. The subsystem for requesting data packets places each request in a queue and transfers any image data packet received to the data packet display subsystem. Thus the system described makes it possible to download an image in small pieces. However, the aforementioned document does not provide any indication on the way to create the requests in order to obtain these image pieces, nor on the way to order them. This is because the system described aims not to present a predefined animation to a user but to transmit the image pieces according to the user's requests for particular effects: this system aims in particular to be used for the display of high-resolution geographical maps, of which the user at a given moment sees only part of the map.

In the same connection, the JPIP protocol has been developed in order to access to image content in the JPEG2000 standard from a client terminal, as described for instance in "*Architecture, Philosophy and Performance of JPIP: Internet Protocol Standard for JPEG2000*", by D. Taubman and R. Prandolini in Visual Communications and Image Processing 2003, Proceedings of SPIE Vol. 5150. This article notably explains how the server may optimise its response to a given request received from the client terminal and determined based on the terminal user's selection.

On the other hand, techniques have already been proposed for creating a downloadable file containing an animation which may be played on a computer, for example the technique known as "Flash" developed by the company Macromedia. Such an animation typically includes one or more images in the JPEG2000 format.

According to techniques of this type using keyframes and interpolation data top define images between two keyframes, the display quality of the animation directly depends on the number of keyframes. Thus, the more keyframes there are, the smaller the number of interpolations and consequently the higher the visual quality of the animation. However, the more keyframes there are to transmit, the higher the transmission rate and the higher the calculation cost for processing the keyframes.

It is therefore necessary to find a compromise between the quality of the animation (i.e. the quality of images forming the animation) on the one hand, and the calculation capacities and bandwidth of the network on the other hand.

In document U.S. Pat. No. 6,081,278, two versions of an animation are stored on a server. One of the versions comprises a higher number of keyframes than the other.

When a client terminal requests the animation, it sends its features to the server which determines which version is the best adapted before sending that version.

If many client terminals request an animation simultaneously, the calculation workload linked to seeking the version adapted to each client terminal may become too great for the server.

Another solution of this kind is also described in U.S. Pat. No. 6,476,802 with similar drawbacks.

Document U.S. Pat. No. 6,442,603 deals with the case of a document containing several types of content such as text, audio, image, and video. As in the preceding document, when a client terminal requests the animation, it sends its characteristics to the server. The latter determines what types of data are compatible with the client terminal.

This system has the same drawback as that of the preceding document. Furthermore, it does not enable the quality to be adjusted within the same type of data.

The document entitled "*Low complexity video coding for receiver-driven layered multicast*", by S. Mc Canne, Jacobson and M. Vetterli, which appeared in IEEE Journal of selected areas in communications, Vol. 15, N° 6, August 1997, pages 983-1001, proposes a system in which the server has no active role in the choice of the level of quality of the data sent to a client terminal.

In this system, the server sends several levels of hierarchy of a video stream to separate multipoint addresses. A client terminal subscribes to a certain number of levels. It begins by subscribing to the lowest hierarchical level then attempts to subscribe to the higher levels so long as it experiences no loss.

There is no overload of the server. On the other hand, the traffic related to the management of the multipoint tree structures is high. Furthermore, it is necessary for there to be multipoint-compatible routers in the transmission networks. At the present time, very few of these routers exist on the Internet. Finally, the time for convergence towards the optimum level of quality is high, and this is little compatible with animations of Flash type.

Document U.S. Pat. No. 6,185,625 proposes a method in which the user of the client terminal sets the quality parameters which will be used to play the animation.

This information is transmitted to the server, and the animation is encoded in a specific manner depending on the parameters set by the user. The encoded animation is next transmitted to the client terminal.

This method implies a specific encoding of the animation before its transmission. This may delay the transmission.

Furthermore, the user of the client terminal must have technical knowledge to set the quality parameters appropriately.

In document U.S. Pat. No. 6,442,658, an animation is considered as a set of segments. The segments are classified according to their probability of being played after the current segment and also according to an estimated transmission cost.

Thus, pre-loading is carried out depending on the probability and the cost. The available memory of the client terminals may, furthermore, be taken into account.

The transmission time of the animation is reduced. However, this document does not propose a compromise between the quality of the animation on the one hand, and the calculation capacities and bandwidth of the network on the other hand.

The user guide for Flash MX entitled "Flash MX", published by Dunod, describes the "ActionScript" language which enables a user to dynamically interact with an animation.

The control which is thereby rendered possible is independent of the capacities of the client terminals or the bandwidth.

SUMMARY OF THE INVENTION

The present invention seeks to remedy at least some of the drawbacks of the prior art and therefore proposes a method and device for creating an animation which enable to take into account at least one parameter relating to the download or the display of the animation, while keeping the data exchange as simple as possible.

The invention provides a method of creating an animation comprising a sequence of images, characterised in that it comprises the steps of:
  optimising requests for obtaining images from a remote terminal depending on at least one criterion;
  creating a file comprising the optimised requests.

It is thus possible to benefit from the advantageous use of requests to obtain optimised animation information.

In this context, the invention also provides a method of creating an animation comprising keyframes, characterised in that it comprises the steps of:
  determining a plurality of versions of the animation depending on at least one criterion corresponding to at least one characteristic of the client liable to download the animation.
  creating a file comprising a description of the different versions determined and their associated criterion.

A method and device for creating an animation is thus provided, which enable a compromise to be made between the quality of the animation on the one hand and/or the calculation capacities of a client terminal and the bandwidth of the transmission network on the other hand.

In this regard, the invention enables fine adaptation of the animation to be made to the capacities of the client terminal and/or the available bandwidth.

The calculation workload at the server is reduced, since it is the client terminal which automatically determines the version that is adapted to it. There is thus no long lag on downloading an animation. This is because, even if there are many client terminals which request the animation simultaneously, the calculations are distributed to the client terminals.

According a first embodiment, the determining step comprises the steps of:
  attributing a level of priority to each keyframe,
  calculating an overall decoding cost of the keyframes of each priority level.

In this case, the decoding cost is adapted to the calculation capacities of the client terminal who downloads the animation.

According to a possible feature, a version of the animation comprises keyframes to which the same level of priority has been attributed.

Thus, the number of keyframes to download varies depending on the level of priority.

According a second embodiment, the determining step comprises the steps of:
  determining several classes of client terminal depending on their bandwidth,
  determining a version of each keyframe for each class of client terminal.

In this case, it is the bandwidth which is taken into account. The downloading time of the animation is thus limited.

Naturally, it is possible to take into account both the calculation capacities of the client terminals and the bandwidth.

According to a possible feature, the creating step comprises determining requests for each keyframe that are adapted for obtaining each keyframe from a remote terminal.

According to another possible feature, the requests are of JPIP type.

The JPIP requests are established according to the protocol already referred to.

The invention also concerns a method of downloading an animation from a server to a client terminal, the animation having been created by the creating method presented above, characterised in that it comprises the steps of:
  receiving the description of the different versions of the animation,
  selecting a version of the animation depending on at least one characteristic of the client terminal,
  sending out requests depending on the version selected.

According to the first embodiment, the selecting step comprises the steps of:
  determining a level of priority of the animation depending on the overall decoding cost of the keyframes of each level of priority and on the processing capacities of the client terminal.
  selecting the keyframes belonging to the level of priority determined.

According to the second embodiment, the selecting step comprises the steps of:
  determining the actual bandwidth of the client terminal,
  identifying the class of the client terminal depending on its actual bandwidth,
  selecting the versions of the keyframes corresponding to the class of the client terminal.

In the same context, the present invention proposes a method of creating an animation consisting of a sequence of fixed images, remarkable in that it comprises steps of:

defining the animation from a fixed image;

generating requests to obtain data necessary for displaying the images; and optimising the requests.

It is thus taken advantage of the file format containing the animation. When this file format offers the possibility of loading only the parts of an image intended to be displayed to the user, it is possible at each moment of the animation to transmit only the minimum information necessary. This possibility is offered in particular by files to the standardized JPEG2000 format.

Thus, when a user triggers the display of the animation, only a small set of information is transmitted to him, in this case a list of commands defining the animation. Next, as the animation continues, the data necessary for displaying each of the images of the animation is downloaded.

These features therefore combine in an original manner the advantages of the aforementioned two techniques, namely the definition of the animation by all the commands implementing it and the progressive downloading of the data necessary for displaying the animation.

Compared with the first technique, which consists of saving the animation using a conventional film format, the invention makes it possible to reduce the quantity of data to be transferred for each image. Thus, for constant quality, the invention makes it possible to reduce the bandwidth necessary for displaying the animation. Conversely, keeping a constant bandwidth, the invention makes it possible to increase the quality of the animation transferred.

Compared with the second technique, which consists of defining the animation from an initial image and a list of commands to be applied to this image, the invention makes it possible to download only the data necessary for displaying a first image before starting the display of the animation. Thus the response time of the application causing the animation to be played is reduced.

The animation definition step may comprise a substep of defining a plurality of key images and a plurality of transitions between the key images.

Thus the creator of the animation can define the animation which he wishes to produce by describing only a few of the images composing the animation rather than each of the images describing the animation. The creator of the animation can also describe the transitions between these key images in order to specify the behavior of the animation between two key images.

The animation definition step may also comprise a substep of interpolation between the key images.

Thus all the images making up the animation are calculated automatically from a few key images described as well as transitions between these key images. This frees the creator from the manual implementation of this task.

The animation definition step may comprise substeps consisting, for each image of the animation, of:

calculating the rectangle encompassing the image;

calculating a list of precincts containing the data constituting the image; and obtaining the required quality level for the image.

These various steps enable the invention to calculate which parts of the initial fixed image are necessary for the display of each image of the animation and therefore to create the request for downloading this data.

The request optimisation step may comprise a substep consisting of eliminating in each request the data already obtained by a previous request.

This makes it possible to reduce the volume of information transmitted and thus to minimize the waiting time of the user before being able to play the animation.

This is because, for each image of the animation from the second image onwards, knowing that only the data not yet received by the user is transmitted to the user, the volume of data transmitted for each image remains much less than that which would be necessary to transmit the corresponding image of a film representing the same animation. This is because, in the case of a film, the compression algorithm used for reducing the quantity of data transmitted does not have knowledge of the methods used for generating the sequence of images constituting the film, whilst, according to the invention, the technique of reducing the quantity of data transmitted is based on these same methods.

The request optimisation step may comprise a substep consisting of distributing between the various requests the data requested by these requests so that the sizes of the data requested by these requests are similar.

Thus the bandwidth necessary for correctly displaying the animation, which is defined from the maximum size of the data requested by a request, is reduced.

The distribution substep may take into account, for each request, the mean size of the data requested by the other requests.

Thus the requests requiring a greater bandwidth than the others can be reduced whilst those requiring a lesser bandwidth than the others can be increased.

If the size of the data requested by a request exceeds the mean size by a predetermined value, the mean size may be calculated without taking account of the size of the data requested by this request and the request optimisation step may comprise a substep of creating an initialization request, intended to request the excess data originating from this request.

Thus, if a request requires a much greater quantity of data than the other requests (this is often the case with the first request), part of these data are transmitted during the animation initialization phase. The initial downloading of the animation is then greater but the bandwidth necessary subsequently is reduced.

The method according to the invention may also comprise a step consisting of storing in a file the optimised requests produced by the optimisation step.

Thus the result can be stored in a server computer to which users can connect in order to download and display the animation.

During the step of storing optimised requests, there may also be stored, for each request, information indicating the data which will not be used in the remainder of the animation.

Thus the application enabling the user to display the animation can store in memory only the data necessary for the remainder of the animation, saving on the memory necessary for playing all the animation.

The substep of defining a plurality of key images and transitions may comprise the definition of a plurality of characteristics for each key image, amongst which there may be the display date of the image in the sequence, the outline, the resolution and the required quality.

Thus the creator of the animation can control various parameters for defining the aspect of each key image and therefore the appearance of the animation which he is producing.

The substep of defining a plurality of key images and transitions may comprise the definition of a path connecting the centres of the key images.

Thus the creator of the animation can more precisely control each of the transitions and therefore more precisely control the appearance of the animation which he is producing.

The present invention also proposes a method of managing an animation created by an animation creation method as succinctly described above, this management method being remarkable in that it comprises steps of:
- transmitting optimised requests to at least one user liable to play the animation;
- transmitting the data resulting from the requests executed by the user playing the animation.

The user thus receives a minimum amount of information in the form of requests which nevertheless enable him to play the animation.

In a particular embodiment, this management method also comprises a step of transmitting animation definition data resulting from the animation definition step mentioned above, this animation definition data transmission being concomitant with the transmission of the optimised requests.

Thus the invention makes it possible to directly transmit to the user the requests making it possible to play the animation and the data necessary for displaying the first image or images of the animation. When the user has received these requests and data, he can immediately commence the playing of the animation. If necessary, the data transmitted at the same time as all the requests can comprise data which will be necessary later in the animation in order to reduce the bandwidth necessary for playing the animation. This is particularly advantageous when a portion of the animation requires a much larger bandwidth than the rest of the animation: this characteristic then makes it possible to align the bandwidth demand of this part of the animation with that of the rest of the animation.

In a complementary manner, the invention relates to a device for creating an animation comprising a sequence of images, characterised in that it includes:
- means for optimising requests for obtaining images from a remote terminal depending on at least one criterion
- means for creating a file comprising the optimised requests.

According to a first possible implementation, the invention proposes a device for creating an animation comprising keyframes, characterised in that it comprises:
- means for determining a plurality of versions of the animation depending on at least one criterion corresponding to at least one characteristic of the client liable to download the animation,
- means for creating a file comprising a description of the different versions determined and their associated criterion.

The invention also relates to a device for downloading an animation from a server to a client terminal, the animation having been created by the above creating device, characterised in that it comprises:
- means for receiving the description of the different versions of the animation,
- means for selecting a version of the animation depending on a characteristic of the client terminal,
- means for sending requests depending on the version selected.

According to a second possible implementation, the invention proposes a device for creating an animation consisting of a sequence of fixed images, remarkable in that it comprises:
- a module for defining the animation from a fixed image;
- a module for generating requests for obtaining data necessary for displaying the images; and
- a module for optimising the requests.

The present invention also proposes a device for managing an animation created by an animation creation device as succinctly defined above, this management device being remarkable in that it comprises:
- a module for transmitting the optimised requests to at least one user liable to play the animation;
- a module for transmitting the data resulting from the requests executed by the user playing the animation.

The devices according to the invention may comprise means for implementing the features already set out.

The creating, downloading and managing devices would then have similar advantages to those already set out.

The invention also relates to a file comprising the encoding data of an animation created by the creating method already presented, characterised in that it comprises an indexing, a series of requests, a priority and a display time, for each keyframe, and furthermore the calculation cost of each level of priority.

The invention also relates to a file comprising the encoding data of an animation created by the creating method already presented, characterised in that it comprises an indexing, a series of requests classified according to the classes of client terminals and a display time, for each keyframe, and furthermore the definition of the classes.

The invention also relates to a digital apparatus including the device according to the invention or means for implementing the method according to the invention. This digital apparatus is for example a digital camera, a digital camcorder, a scanner, a printer, a photocopier, or a fax machine. The advantages of the device and of the digital apparatus are identical to those already set out.

The present invention also relates to a communication apparatus comprising an animation creation device as above.

An information storage means, which can be read by a computer or microprocessor, integrated or not into the device, and possibly removable, stores a program implementing the methods according to the invention.

A computer program readable by a microprocessor and comprising one or more sequences of instructions is capable of implementing the methods according to the invention.

BRIEF DESCRIPTION OF THE DRAWINGS

The characteristics and advantages of the present invention will appear more clearly from a reading of a preferred embodiment illustrated by the accompanying drawings, in which:

FIG. 12 represents an image list structure.

DETAILED DESCRIPTION OF PREFERRED EMBODIMENTS

Figure 1:
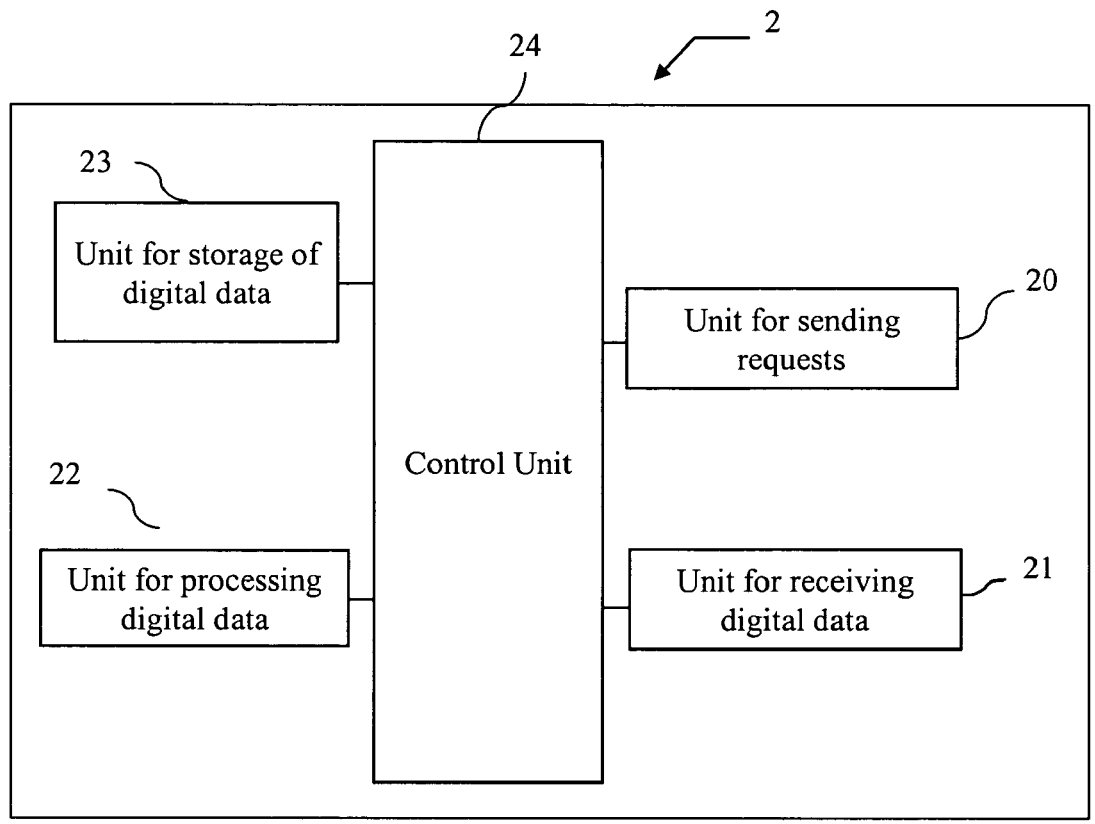
FIG. 1 is an embodiment of a device implementing the invention.
Figure 1:
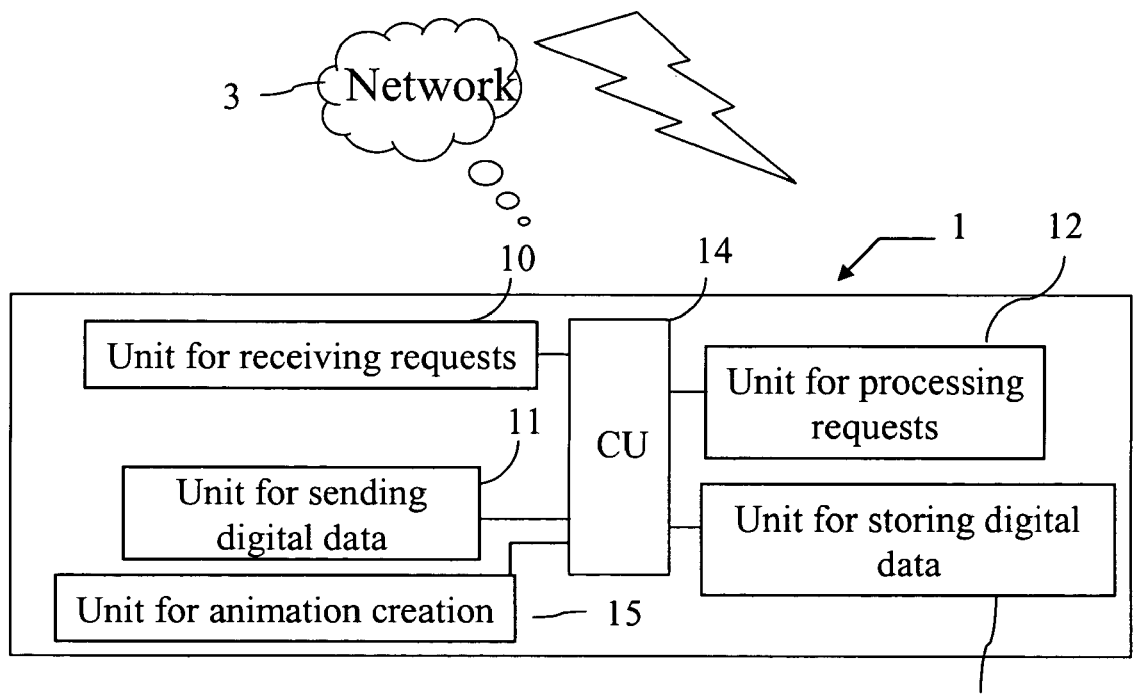

According to the chosen embodiment represented in FIG. 1, a server 1 is connected to client terminals 2, of which only one is represented, via a communication network 3.

The server 1 and the client terminal 2 are computers, an example of the architecture of which is described below.

The connection between the two devices is conventional and will not be described here. It is for example of http type. It is assumed that the transmission of data is made without loss.

The server 1 comprises a unit 10 for receiving requests coming from the client terminal 2. It also comprises a unit 11 for sending out digital data to the client terminal 2.

Unit 10 for receiving requests transmits the requests received to the processing unit 12. The processing comprises identifying the required data, formatting them and transmitting them via unit 11.

The server 1 also comprises a memory 13 in which data are stored. A control unit 14 controls the operation of the units of the server 1.

According to the invention, the server 1 comprises a unit 15 for creating an animation, which comprises:
  means for optimising requests for obtaining images from a remote terminal depending on at least one criterion, for instance by determining a plurality of versions of the animation depending on said criterion which may for example correspond to at least one characteristic of the client liable to download the animation, or by eliminating in each request the data already obtained by a previous request, or by distributing between the various requests the data requested by these requests.
  means for creating a file comprising the optimised requests and possibly a description of the different versions determined and their associated criterion.

The client terminal 2 comprises a unit 20 for sending requests to the server 1. It also comprises a unit 21 for receiving digital data coming from the server 1.

Unit 21 transmits the received data to processing unit 22. The processing, which the present invention concerns, is set out below using algorithms.

According to the invention, unit 21 receives the description of the different versions of the animation. Unit 22 selects a version of the animation according to at least one characteristic of the client terminal. Finally, unit 20 sends out requests according to the version selected.

The client terminal 2 also comprises a memory 23 in which data are stored. A control unit 24 controls the operation of the units of the client terminal 2.

Figure 2:
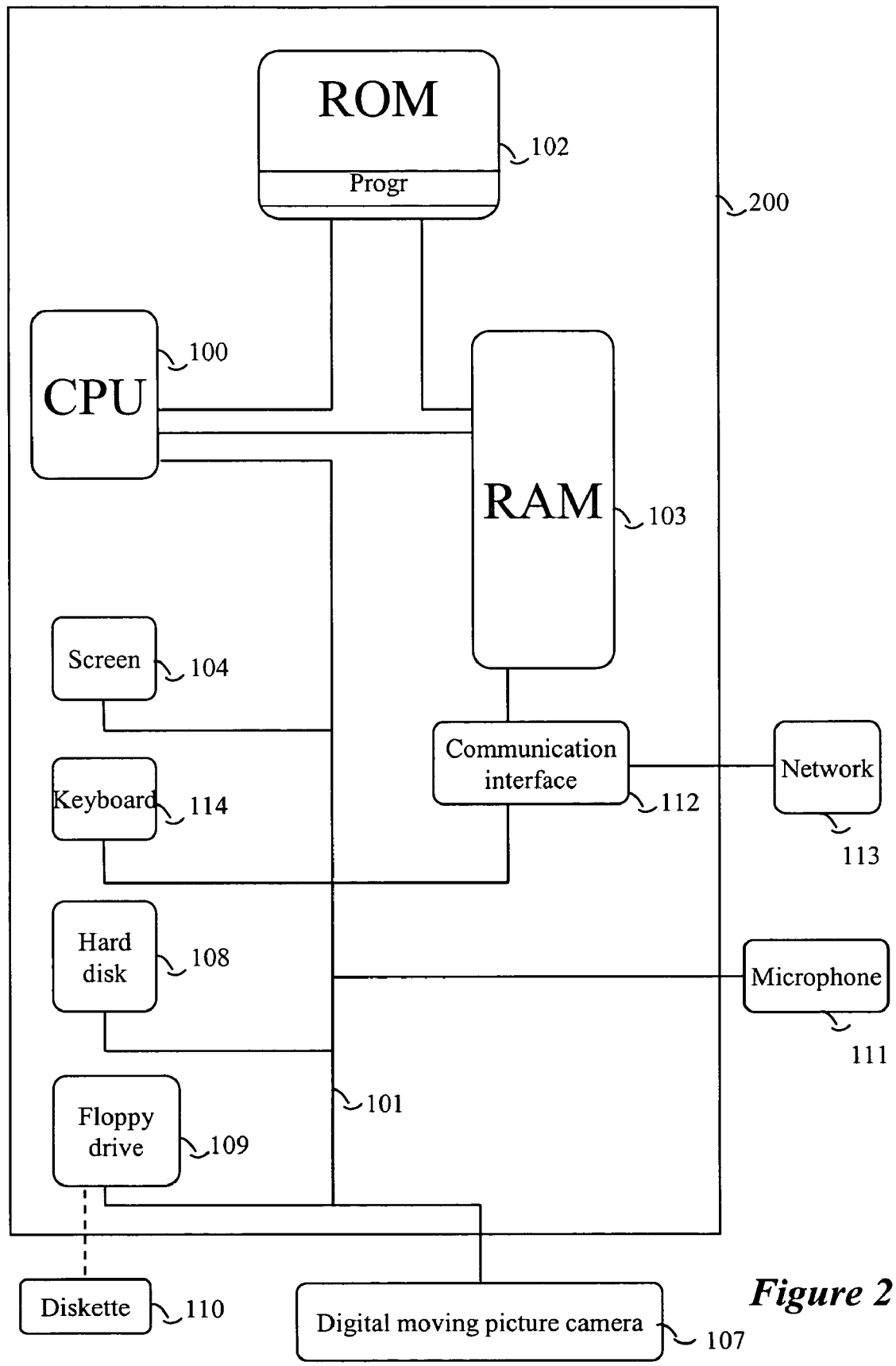
FIG. 2 represents a device according to the invention.

According to the chosen embodiment shown in FIG. 2, a device implementing the invention is for example a microcomputer 10 connected to different peripherals, for example a digital moving picture camera 107 (or a scanner, or any means of acquiring or storing an image) connected to a graphics card and supplying information to be processed according to the invention.

The device 10 comprises a communication interface 112 connected to a network 113 able to transmit digital data to be processed or conversely to transmit data processed by the device. The device 10 also comprises a storage means 108 such as a hard disk. It also comprises a drive 109 for a disk 110. This disk 110 may be a diskette, a CD-ROM, or a DVD-ROM, for example. The disk 110, like the disk 108, can contain data processed according to the invention as well as the program or programs implementing the invention which, once read by the device 10, will be stored on the hard disk 108. According to a variant, the program enabling the device to implement the invention can be stored in a read only memory 102 (referred to as ROM in the drawing). In a second variant, the program can be received in order to be stored in an identical fashion to that described previously via the communication network 113.

The device 10 is connected to a microphone 111. The data to be processed according to the invention will in this case consist of audio signal.

This same device has a screen 104 for displaying the data to be processed or serving as an interface with the user, who can thus parameterize certain processing modes, using the keyboard 114 or any other means (a mouse for example).

The central processing unit 100 (referred to as CPU in the drawing) executes the instructions relating to the implementation of the invention, which are stored in the read only memory 102 or in the other storage means. On powering up, the processing programs stored in a non-volatile memory, for example the ROM 102, are transferred into the random access memory RAM 103, which will then contain the executable code of the invention, as well as registers for storing the variables necessary for implementing the invention.

In more general terms, an information storage means, which can be read by a computer or microprocessor, integrated or not into the device, and which may possibly be removable, stores a program implementing the method according to the invention The communication bus 101 affords communication between the different elements included in the microcomputer 10 or connected to it. The representation of the bus 101 is not limiting and, in particular, the central processing unit 100 is able to communicate instructions to any component of the microcomputer 10 directly or by means of another element of the microcomputer 10.

Figure 3:
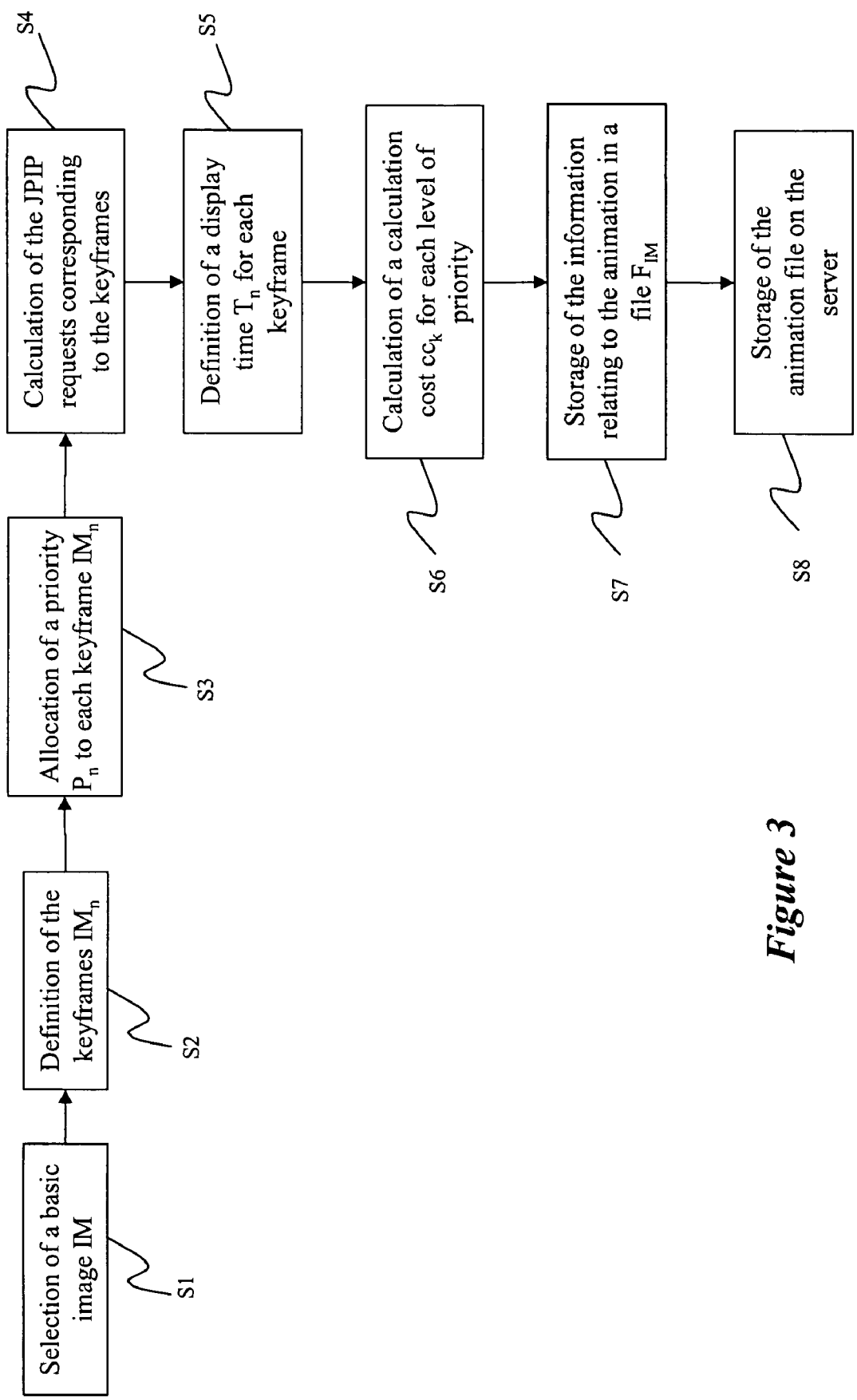
FIG. 3 represents a first embodiment of an animation creating method according to the invention.

FIG. 3 represents a first embodiment of a method of creating an animation, according to the invention. This method is implemented in the creating device and comprises steps S1 to S8.

The method is carried out in the form of an algorithm which can be stored in whole or in part in any means of information storage capable of cooperating with the microprocessor. This storage means is readable by a computer or by a microprocessor. The storage means may or may not be integrated into the device, and may be removable. For example, it may comprise a magnetic tape, a diskette or a CD-ROM (fixed memory compact disk).

Step S1 is the selection of an image IM to serve as a basis for the animation. The image is encoded according to the JPEG2000 standard which enables rapid and easy access to different resolutions, qualities and regions of interest of the image.

The animation is created on the basis of that single image. As a variant, the animation is created on the basis of several images.

The following step S2 is the definition of the keyframes $IM_n$ of the animation, with n being an integer varying between 1 and an integer N. For this, the user uses a graphical interface. This interface is for example generated using the C++ library for graphical interface design QT provided by the company TrollTech, available at the Internet address: http://www.trolltech.com/.

Figure 4:
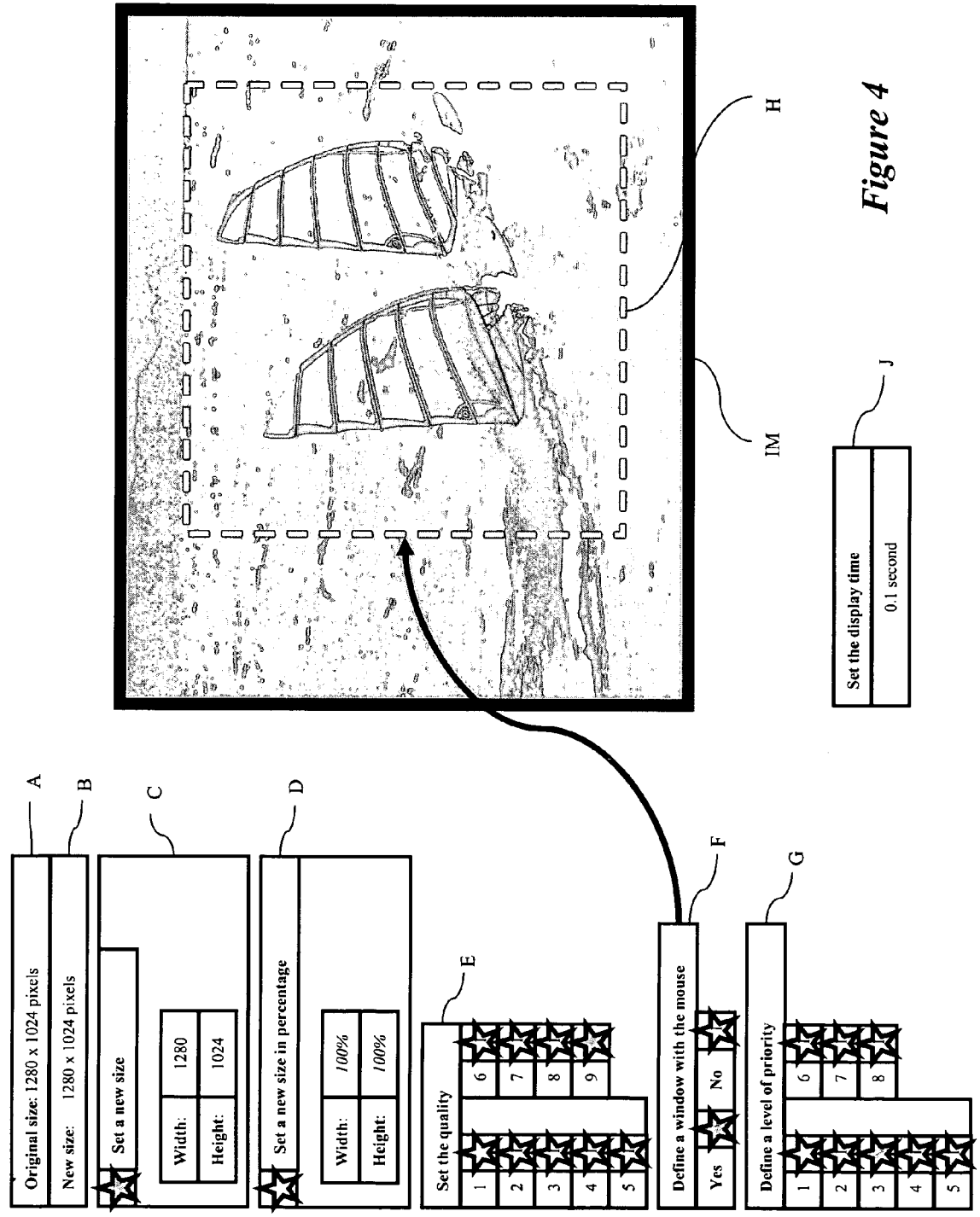
FIG. 4 represents an graphical interface used in the method of FIG. 3.

This interface comprises several windows. As shown in FIG. 4, window A displays the original size of the image. Window B displays the size of the image after modification. Windows C and D make it possible to modify the size of the image. A new size expressed in pixels may be defined in window C or a new size expressed as a percentage of the size of the initial image may be defined in window D.

It should be noted that in the preferred embodiment of the invention, only sizes corresponding to the resolutions defined in the original image may be chosen.

Window E enables the quality of the image to be chosen. For example, the images have nine levels of quality.

Window F enables it to be indicated that a rectangular region H of the image IM will be selected.

Window J enables the time for display of the image to be set.

The following step S3 is the definition of a level of priority $P_n$ for each keyframe $IM_n$. The level of priority of a keyframe depends on its importance. An image which can be approximated by interpolation between two other images receives a low level of priority. An image which would be degraded by an approximation by interpolation receives a higher priority. An image which cannot be interpolated receives a still higher priority.

Eight levels of priority $P_1$ to $P_8$ are for example available. Level 1 is the highest level of priority. The priorities decrease down to level 8. The user defines the level of priority of the image by virtue of window G (FIG. 4).

The following step S4 is the calculation for each keyframe $IM_n$ of requests $R_{n1}, R_{n2}, \ldots$ according to the JPIP protocol. The JPIP protocol for transmission of data encoded according to the JPEG2000 standard enables a remote terminal to retrieve an image.

A list of JPIP requests is thus formed and stored in a file adapted to be downloaded, interpreted then played on a client terminal. This file, or animation script, is for example in SWF format. The JPIP requests are established according to a protocol in course of standardized proceedings, a description of which may be found at the Internet address: http://www.jpeg.org.

For each keyframe, information relating to the size, the resolution, the quality, and the region selected, which were defined at step S2, are inserted in the JPIP requests.

The following step S5 is the definition, using window J, of a time $T_n$ for display of each keyframe image $IM_n$. A display time is a time in seconds, determined from the start of the animation. On the later playing of the animation, each image is displayed at the defined time.

The following step S6 is the calculation of the overall decoding cost $cc_k$ of each level of priority $P_k$ with k being an integer between 1 and 8. The overall decoding cost $cc_k$ of a level of priority $P_k$ is the cost of decoding of the keyframes of the given level of priority, and of interpolation of the other images on the basis of those keyframes.

For this a software tool for program analysis, such as that named "Quantify" from the company Rational Software Corporation, described at the Internet address www.rational.com/products/quantify nt/, determines the number of elementary operations performed on execution of the program and the execution time of the program.

The number of elementary operations performed per second is then calculated by dividing the first result by the second.

As a variant, the command "Time" in the Unix and Linux operating systems makes it possible to determine the calculation cost of a program.

An embodiment of step S6 is detailed below.

Figure 5:
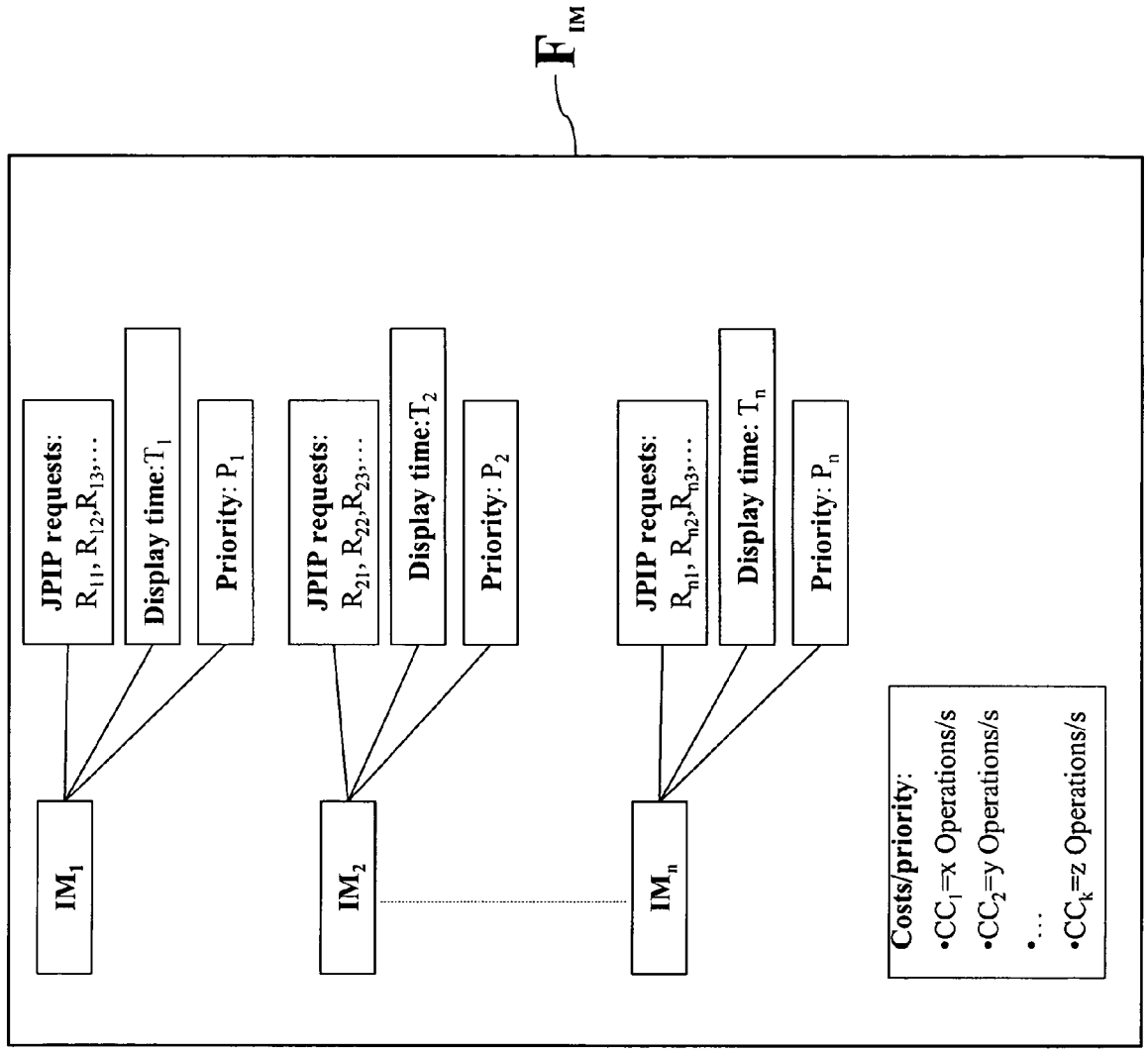
FIG. 5 represents a file containing an animation according to the invention.

The following step S7 is the storage in memory of the data relating to the animation in a file $F_{IM}$ represented in FIG. 5. This file comprises, for each keyframe $IM_n$, the indexing n, the series of JPIP requests $R_{n1}, R_{n2}, \ldots$, the priority $P_n$ and the display time $T_n$.

It further comprises the calculation cost $cc_k$ of each level of priority.

The following step S8 is the storage in memory of the above file on the server.

Figure 6:
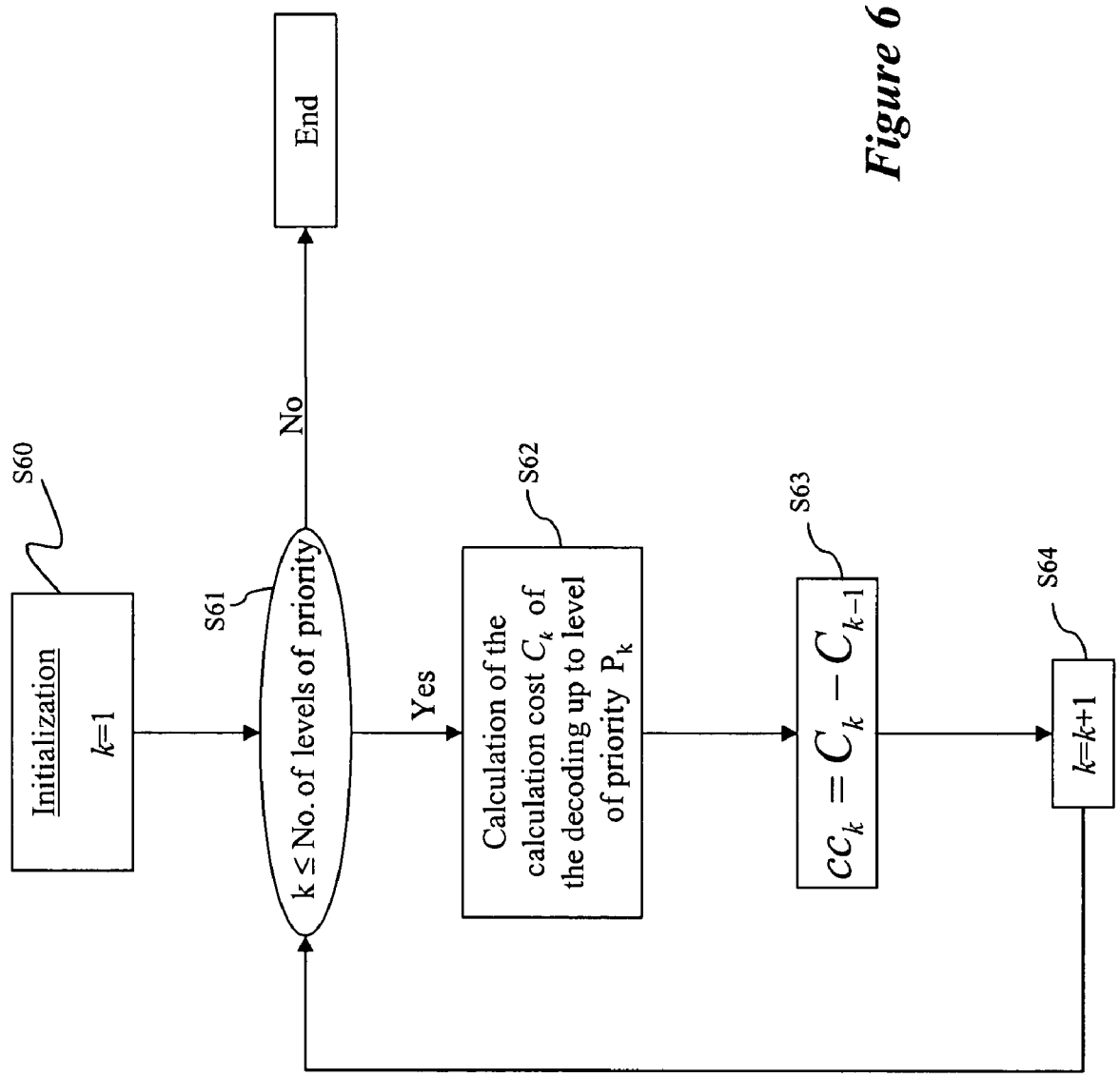
FIG. 6 represents an embodiment of calculation of a calculation cost, included in the method of FIG. 3.

Step S6 of determining a calculation cost for each level of priority of an animation is now detailed with reference to FIG. 6, in the form of an algorithm comprising steps S60 to S64.

Step S60 is an initialization at which a variable k is initialized to the value one. The variable k represents the current level of priority.

The following step S61 is a test to determine whether the variable k is less than or equal to the number of levels of priority. If the response is positive, that step is followed by the step S62 at which the calculation cost $C_k$ of decoding the animation considering only the levels of priority from 1 to k is calculated. As already set out, this cost is calculated with a tool for program analysis that is known per se.

The following step S63 is the calculation of the calculation cost $cc_k$ of the current level. For this, the calculation cost $C_k$ calculated at the preceding step is reduced by the calculation cost $C_{k-1}$ calculated at the preceding iteration. Naturally, on going through this step (k=1) for the first time, the quantity $C_{k-1}$ is zero.

At the following step S64, the variable k is incremented by one unit. This step is followed by the step S61 already described.

When the response is negative at step S61, the calculation costs of all the levels of priority of the animation have been determined.

Figure 7:
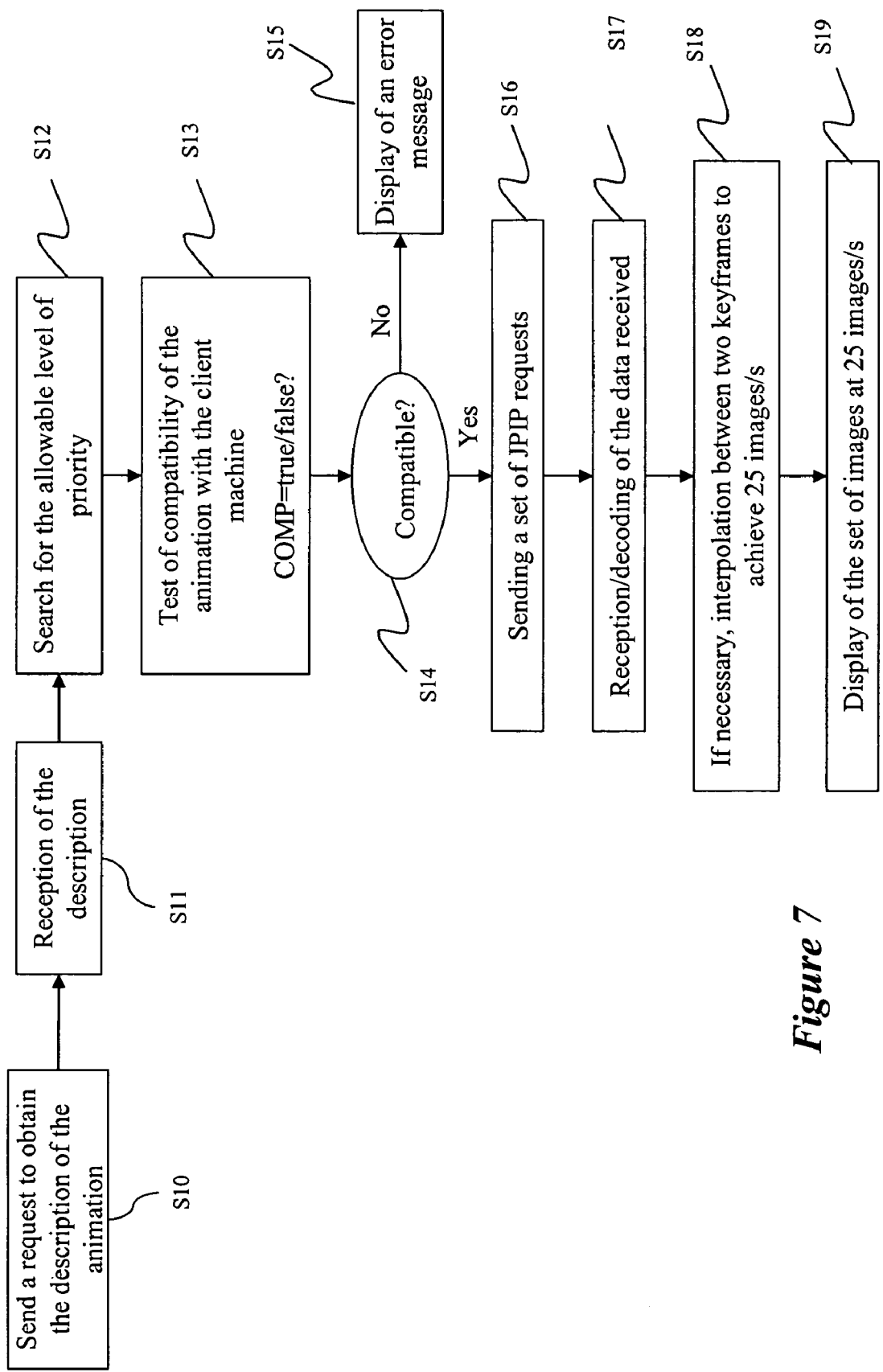
FIG. 7 represents a first embodiment of an animation downloading method according to the invention.

FIG. 7 represents a first embodiment of a method of downloading an animation, according to the invention. This method is implemented in the client terminal 2 and comprises steps S10 to S19.

The method is carried out in the form of an algorithm which can be stored in whole or in part in any means of information storage capable of cooperating with the microprocessor. This storage means is readable by a computer or by a microprocessor. The storage means may or may not be integrated into the device, and may be removable. For example, it may comprise a magnetic tape, a diskette or a CD-ROM (fixed memory compact disk).

Step S10 is the sending of a request to the server to obtain the description file of the animation.

The following step S11 is the reception of the description file.

The following step S12 is the search for the highest possible level of priority depending on the decoding cost of each level of priority and on the processing capacities of the client terminal. This step will be detailed in what follows.

The following step S13 is a test of compatibility of the animation with the client terminal. If no level of priority is compatible with the client terminal, a logic variable COMP is set to the value "false". Otherwise, this variable is set to the value "true".

The following step S14 is a test of the value of the logic variable COMP.

If it indicates an incompatibility, that step is followed by the step S15 which is the display of an error message.

It there is compatibility at step S14, that step is followed by the step S16 which is the sending out of the JPIP requests corresponding to the level of priority determined previously.

The following step S17 is the reception and decoding of the data received in response to the requests sent out.

The following step S18 is an interpolation between the keyframes received, if it is necessary in order to be able to play the animation at 25 images per second. The interpolation is conventional. It is weighted as a function of the distance between the interpolated image and the keyframes used for the interpolation.

The following step S19 is the display of the animation at a frequency of 25 images per second on the client terminal.

Figure 8:
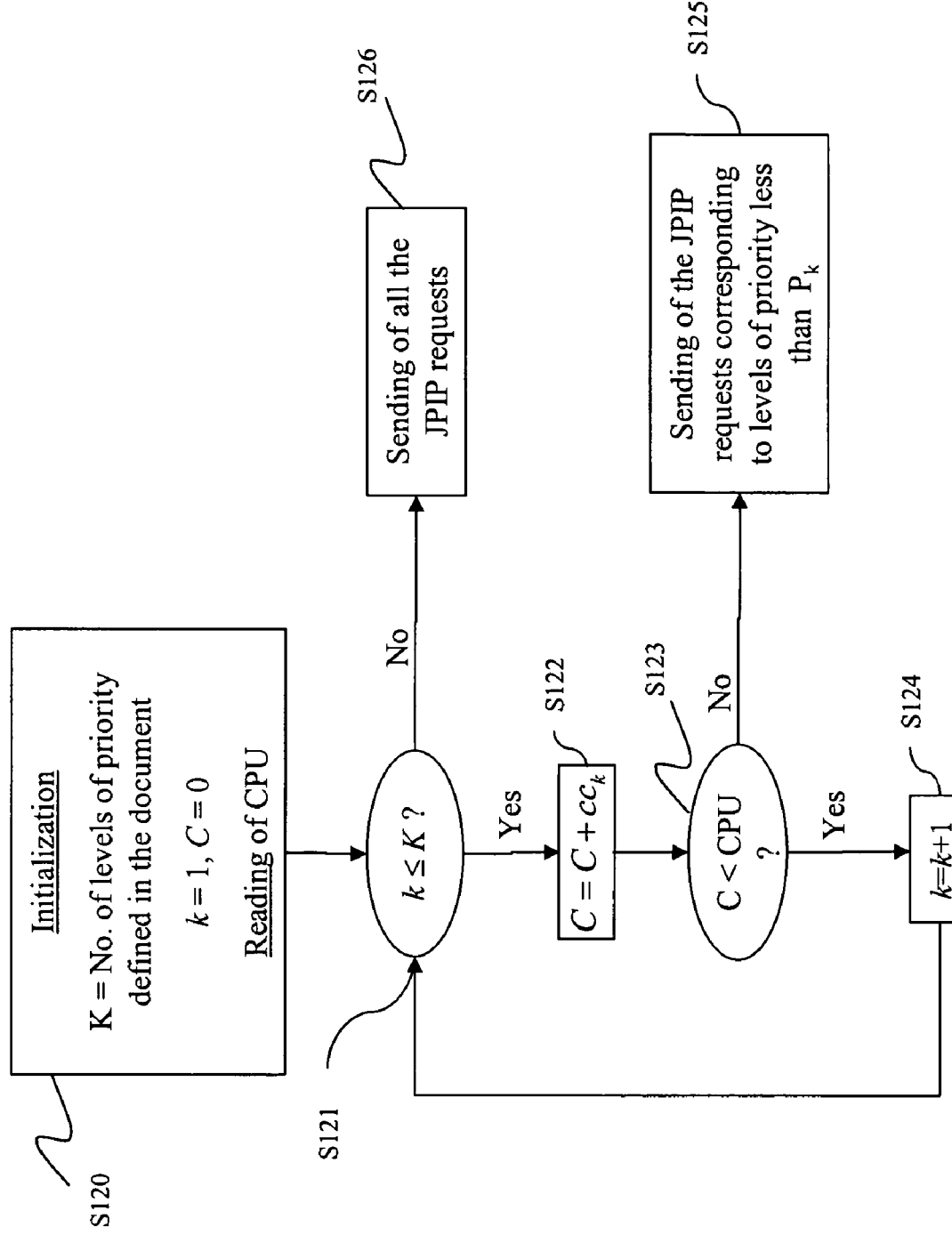
FIG. 8 represents an embodiment for determining priority levels, included in the method of FIG. 7.

Step S12 of searching for the highest possible level of priority depending on the decoding cost of each level of priority and on the processing capacities of the client terminal will now be detailed with reference to FIG. 8, in the form of an algorithm comprising steps S120 to S126.

Step S120 is an initialization at which the number K of levels of priority defined in the animation is read. A variable k is initialized to one. The variable k represents a current level of priority. A variable C is also initialized to the value zero. The variable C represents the cumulative calculation cost of the different levels.

The CPU calculation capacity of the client terminal expressed in number of elementary operations per second is read from the memory 112.

The following step S121 is a test to determine if there remains at least one level of priority to consider. If the response is positive, that step is followed by the step S122 at which the cumulative calculation cost C is increased by the calculation cost of the current level of priority.

The following step S123 is a test to determine whether the calculation cost C is less than the CPU calculation capacity of the client terminal. If the response is positive, that means that the client terminal has a capacity greater than the calculation cost determined. That step is then followed by the step S124 at which the variable k is incremented by one unit to consider a following level of priority.

Step S124 is followed by the step S121 already described.

When the response is negative at step S123, this means that the calculation capacity of the client terminal is less than the calculation cost determined. In that case, step S123 is followed by step S125, at which the JPIP requests corresponding to the levels of priority of ranks lower than that of the current level $P_k$ are transmitted to the communication interface of the client terminal.

When the response is negative at step S121 this means that the calculation capacity of the client terminal is greater than the calculation cost of all the levels of priority of the animation. In that case, step S121 is followed by step S126, at which the JPIP requests corresponding to all the levels of priority of the animation are transmitted to the communication interface of the client terminal.

Figure 9:
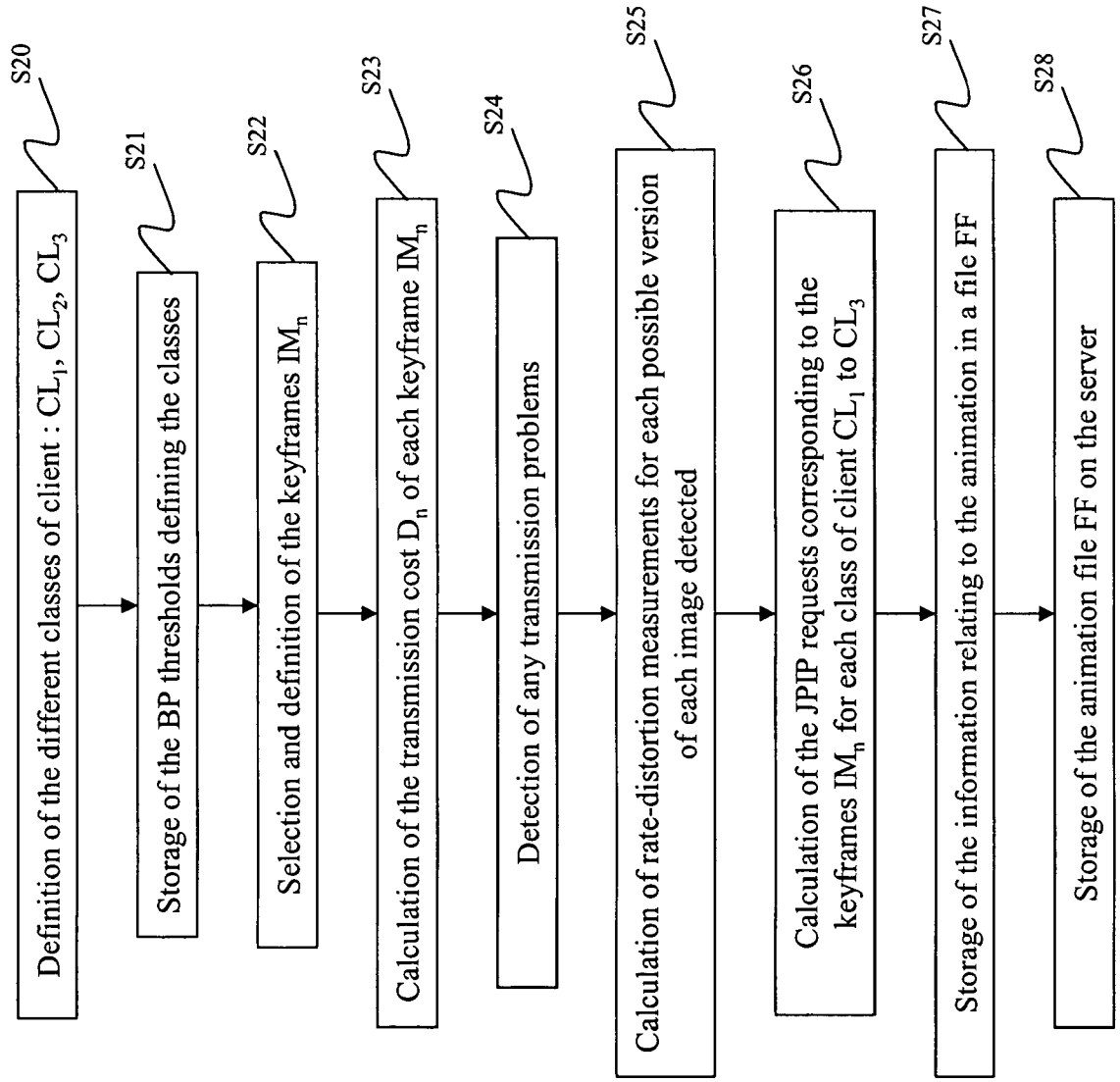
FIG. 9 represents a second embodiment of an animation creating method according to the invention.

FIG. 9 represents a second embodiment of a method of creating an animation, according to the invention. This method is implemented in the creating device and comprises steps S20 to S28.

The method is carried out in the form of an algorithm which can be stored in whole or in part in any means of information storage capable of cooperating with the microprocessor. The storage means is readable by a computer or by a microprocessor. The storage means may or may not be integrated into the device, and may be removable. For example, it may comprise a magnetic tape, a diskette or a CD-ROM (fixed memory compact disk).

Step S20 is the definition of several classes of client terminals. The user has a graphical interface for selecting different values of bandwidths representing the actual rate between the server and a client terminal. For example, three classes $CL_1$, $CL_2$ and $CL_3$ are created.

The following step S21 is the storage in memory of the bandwidth thresholds defining the classes of client terminals.

The following step S22 is the selection and definition of the keyframes $IM_n$ of the animation. One or more images encoded according to the JPEG2000 standard are selected, and keyframes are formed. The construction of the keyframes may be made with a graphical interface of the kind presented in the first embodiment. As a variant, the construction of the keyframes may be made by virtue of a tool for content creation such as the software Flash MX for content creation in Flash format from the company Macromedia. This tool is available over the Internet at the address: www.macromedia.com/software/flash/.

The book entitled "Flash MX" by Guylaine Monnier, published by Dunod, Paris, 2002, describes that software application.

A display time $T_n$ for each keyframe is determined. A display time is a time in seconds, determined from the start of the animation.

The following step S23 is the calculation of the transmission cost of each keyframe $IM_n$. The transmission cost of a keyframe $IM_n$ is the rate $D_n$ necessary for the transmission. The rate $D_n$ is equal to $F \times S_n$, where F is the temporal resolution of the animation, expressed in $s^{-1}$ and $S_n$ is the size of the keyframe considered, expressed in bits.

The transmission costs are stored in memory at this step.

The following step S24 is the detection of any keyframes posing a problem for transmission.

For each class of client, corresponding to a maximum bandwidth, examination is made to see whether any images exceed the maximum bandwidth such that the transmission time between the server and a client terminal is incompatible with a good quality display of the animation on the client terminal.

This step will be detailed in what follows. The result of it is a list L of images not compatible with the maximum bandwidths of the different classes.

The following step S25 is the calculation, for each image of the list L, of a set of pairs (rate, distortion) for each version (resolution, quality) of the image. This step will be detailed in what follows.

The following step S26 is the calculation of the JPIP requests for each keyframe $IM_n$, which will enable each class of client $CL_1$ to $CL_3$ to obtain the version of the keyframe adapted to the bandwidth available to it.

For a given keyframe, it is necessary to retrieve the information relating to the size, the resolution, the quality, and the region that may possibly be selected in the keyframe. It is then necessary to verify whether that keyframe belongs to the list L of the keyframes posing a problem for transmission.

If the current keyframe does not belong to the list L, the preceding information is inserted into the data fields of the JPIP requests.

If the current keyframe belongs to the list L, the associated JPIP requests concern a deteriorated version of the keyframe, and not the initial keyframe.

The classes are considered one after the other. For a given class corresponding to a given bandwidth, and for a given keyframe, the version (resolution and quality) of that image is considered for which the rate is compatible with the bandwidth and for which the distortion is minimum. That version is obtained as a result of the preceding step S25.

The JPIP request for that version is formed and stored in the description file.

Figure 10:
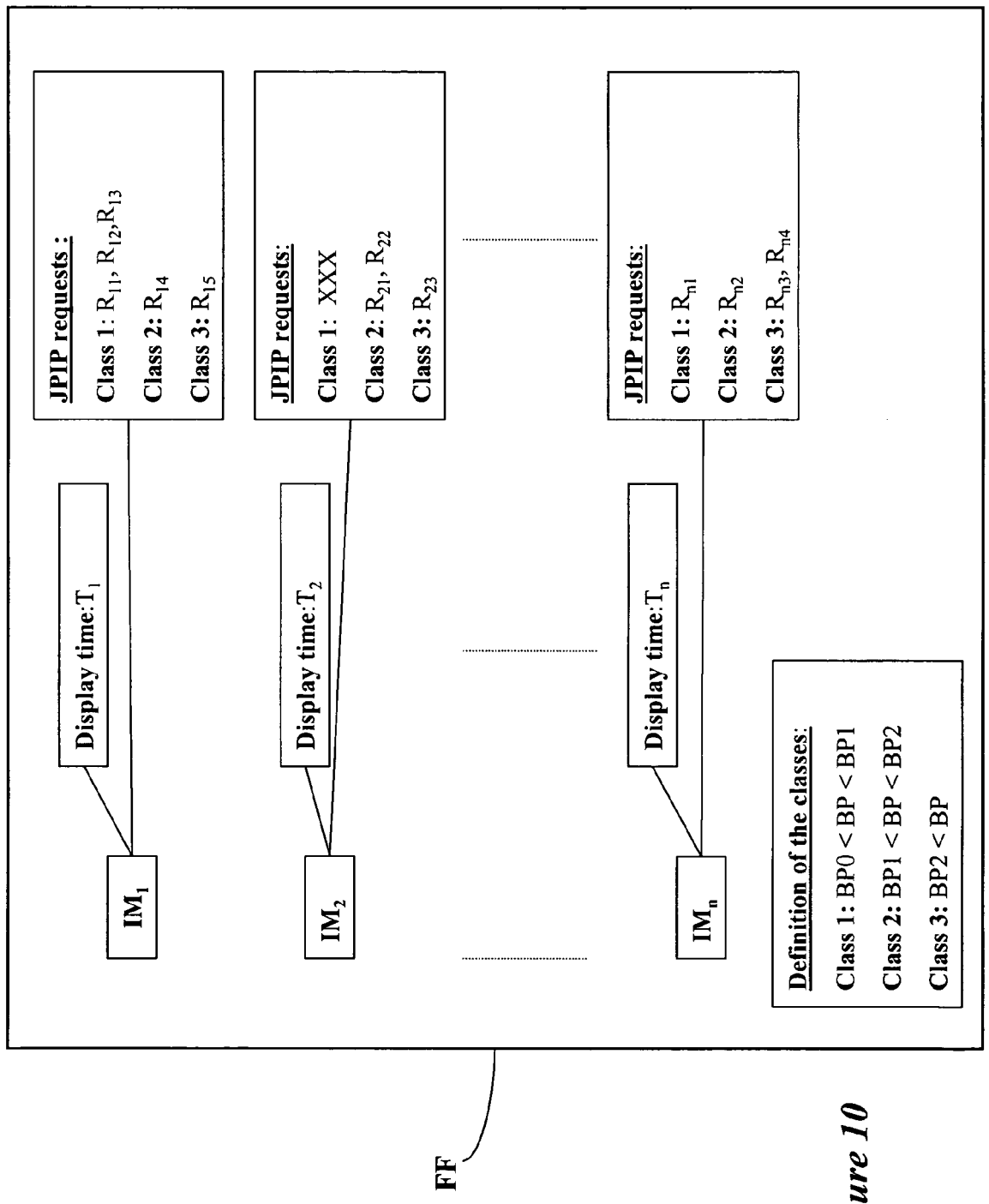
FIG. 10 represents a file containing an animation according to the invention.

The following step S27 is the storage of the data relating to the animation in a file FF represented in FIG. 10. This file comprises, for each keyframe $IM_n$, the indexing n, the series of JPIP requests $R_{n1}$, $R_{n2}$, ... classified as a function of the classes of client terminals and the display time $T_n$.

It further comprises the definition of the classes $CL_1$ to $CL_3$.

The following step S28 is the storage in memory of the file FF on the server.

Figure 11:
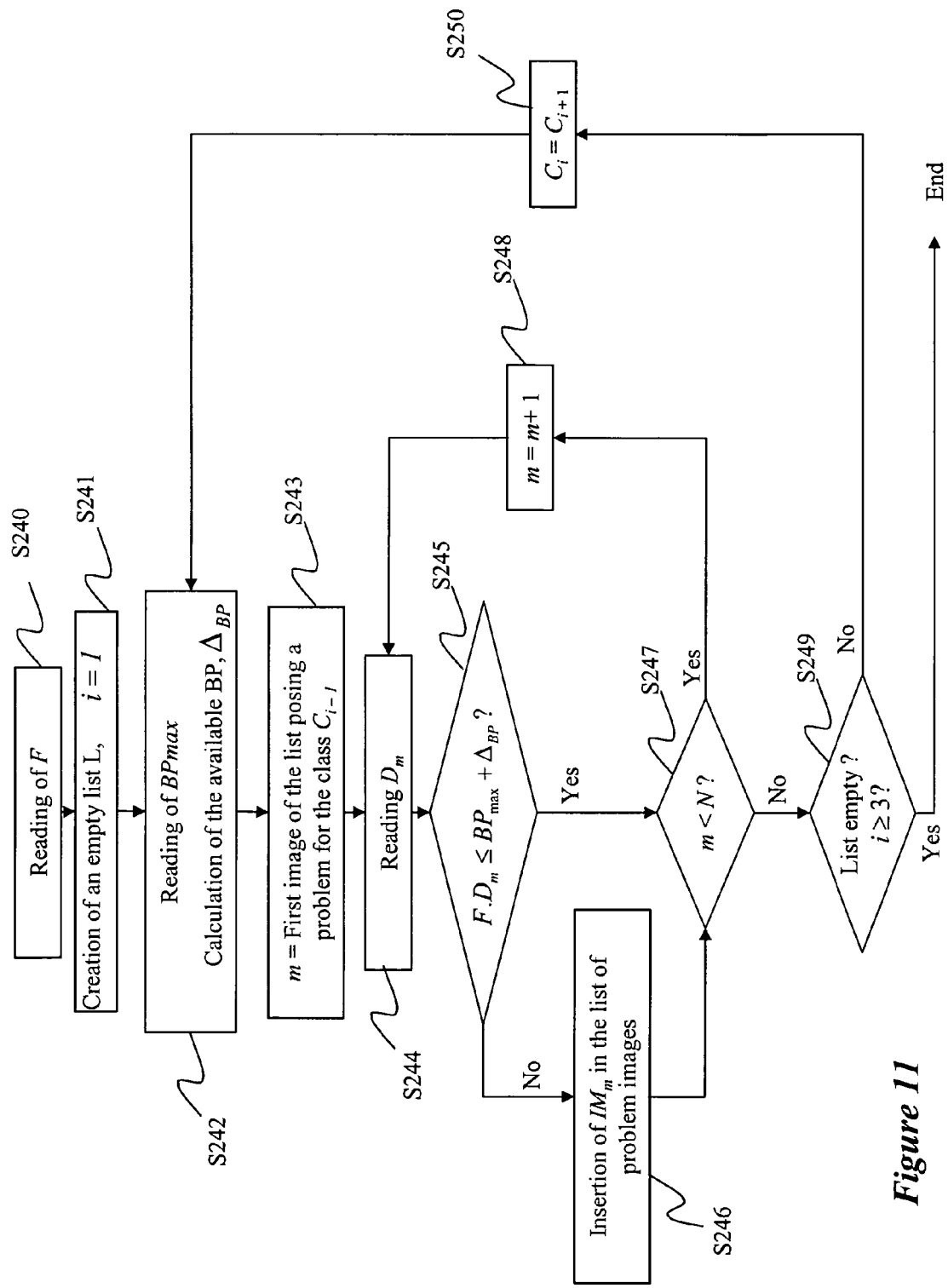
FIG. 11 represents an embodiment for detecting images posing a problem for transmission, included in the method of FIG. 9.

An embodiment of step S24 of determining the images which do not respect the bandwidth is described with reference to FIG. 11, in the form of an algorithm comprising steps S240 to S250.

Step S240 is the reading of the value of the display frequency F of the images of the animation.

The following step S241 is the creation of an empty list L. List L is associated with a table T illustrated in FIG. 12, containing data on each image exceeding one of the maximum bandwidths of the client classes.

For each image of list L, the following data are stored in table T:
the temporal index of the image,
the index of the client class of the lowest possible bandwidth for which the image does not pose any problem,
its size in bytes,
the size at which the creator of the animation desires to display the image in the animation,
the level of quality Qumax set by the creator.

A variable i is initialized to the value one. The variable i represents the index of the current client class $CL_i$. First of all the class corresponding to the lowest bandwidth is considered, then the classes in increasing bandwidth order.

The following step S242 is the reading of the value of the maximum bandwidth $BP_{max}$ associated with the current class $CL_i$. Furthermore, bandwidth $\Delta_{BP}$ is available due to the low transmission cost of the interpolation parameters between two keyframes. The available bandwidth $\Delta_{BP}$ depends on the current maximum bandwidth $BP_{max}$, on the number of images interpolated between two keyframes, on the number of bits necessary for representing the parameters for interpolation and for the frequency of the animation.

The following step S243 is an initialization at which a parameter m is initialized for considering the first keyframe $IM_m$ posing a transmission problem for the class dealt with at the preceding iteration. On going through this step for the first time, the first keyframe of the animation is considered.

The following step S244 is the reading of the size $D_m$ in bytes of the current image.

The following step S245 is a test to determine if the current image respects the bandwidth $BP_{max}$. This involves verifying whether the image can be transmitted in a time less than 1/F. To do this, it is verified whether the inequality:

$F.D_m < BP_{max} + \Delta_{BP}$ is satisfied.

If the response is negative, this means that the current image $IM_m$ does not respect the bandwidth. In this case, step S245 is followed by step S246 at which the current image $IM_m$ is written in the list L, with the data stated earlier.

If the response is positive at step S245, this means that the current image $IM_m$ respects the bandwidth. In this case, step S245 is followed by step S247 which is a test to verify whether there remains at least one keyframe of the animation to process.

If the response is positive, this step is followed by step S248 in order to consider the following keyframe. Step S248 is followed by the previously described step S244.

If the response is negative at step S247, this step is followed by the step S249 which is a test to determine whether the list L is empty for the current class and whether at least one class remains to process.

So long as the response is negative for both these tests, step S249 is followed by the step S250 in order to consider the following class.

Step S250 is followed by the previously described step S242.

When the response is positive for at least one of the two tests of step S249, the processing is terminated.

Figure 13:
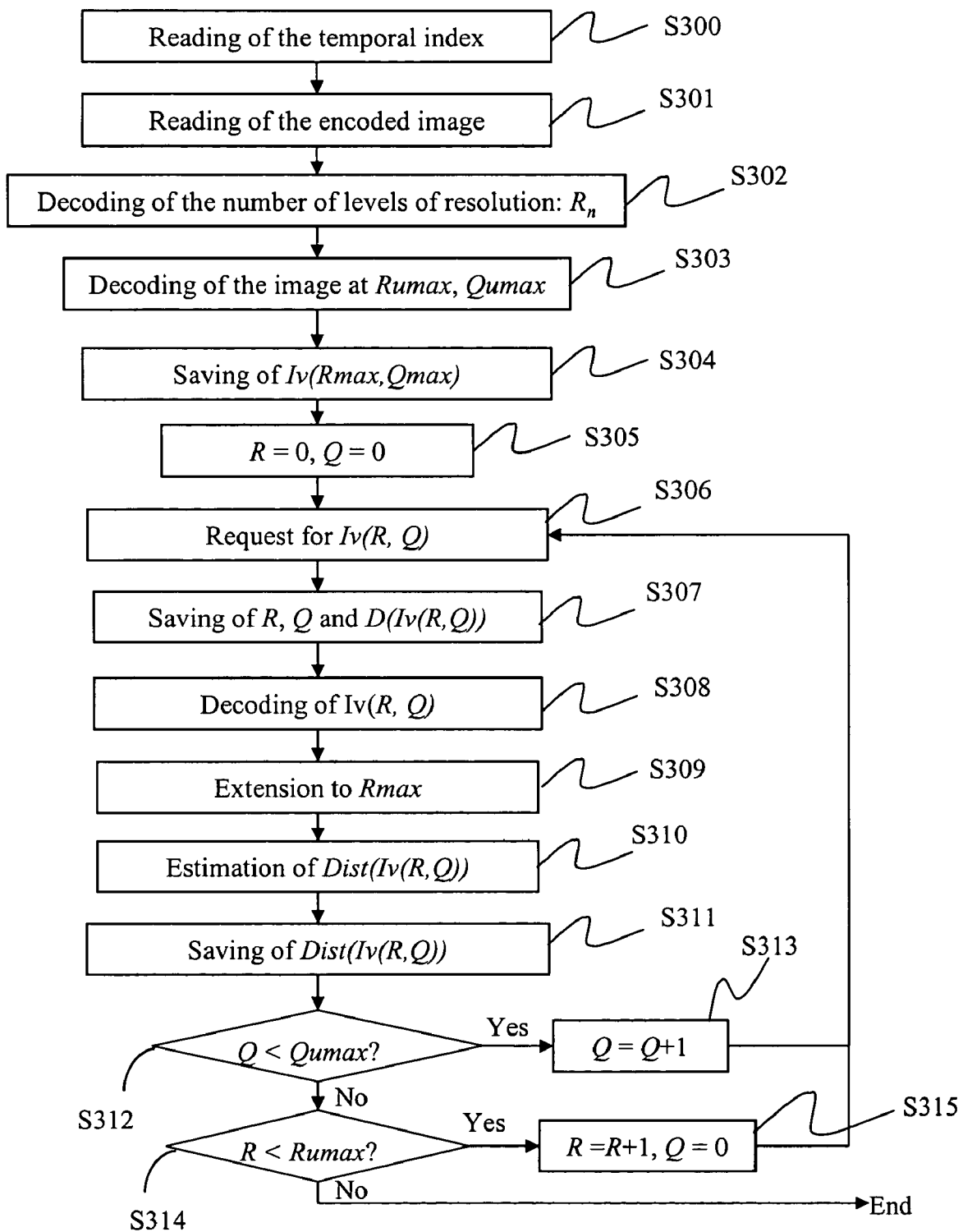
FIG. 13 represents an embodiment for determining different versions of an image respecting a predetermined bandwidth.

An embodiment of step S25 of estimating the quality of different versions of an image of the list L is described with reference to FIG. 13, in the form of an algorithm comprising steps S300 to S315.

An image of the list L is considered here.

Step S300 is the reading of the temporal index of that image.

The following step S301 is the reading of the encoded image. A JPEG2000 decoder then retrieves high-level information relating to that image.

This information is:
the maximum spatial resolution of the image H×W, where H and W are the height and the width of the image expressed in numbers of pixels.
the resolution level number Rmax utilized to represent the image.

The following step S302 is the calculation of the size of the image and of the number of resolution levels which are utilized in the following processing.

The size is provided by the formulae:

$h = \min(H, hu)$ $w = \min(W, wu)$ where hu and wu are the height and the width of the image expressed in numbers of pixels, set by the creator of the animation.

The number of resolution levels is provided by the formulae:

$Ru\max = \min(R(h, w), R\max)$,

Where R(h, w) is the resolution level for which the image has a height and width respectively less than or equal to the height h and the width w.

The following step S303 is the decoding of the image at the resolution Rumax and at the level of quality Qumax.

The following step S304 is the storage of the image Iv(Rumax, Qumax) thus decoded and reconstructed, to serve as a reference image.

The following step S305 is an initialization at which two variables R and Q are initialized to the value zero. The variable R represents the current resolution level and the variable Q represents the current level of quality. The value zero for these two variables corresponds to the lowest levels of resolution and quality.

The following step S306 is the obtainment of the image Iv(R, Q) corresponding to the current resolution level R and current level of quality Q. The image Iv(R, Q) is obtained by a JPIP request.

The following step S307 is the storage of data corresponding to the image Iv(R, Q) in the table T associated with list L (FIG. 12).

This data is:
the size D(Iv(R, Q)) of the image Iv(R, Q), expressed in bytes,
the current resolution level R,
the current level of quality Q.

The following step S308 is the decoding of the current image Iv(R, Q).

The following step S309 is an enlargement of the decoded current image to form an enlarged image Iv(Rumax, Q) at the resolution Rumax. Naturally, if the resolutions R and Rumax are equal, there is no enlargement.

The following step S310 is a comparison of the enlarged image Iv(Rumax, Q) with the reference image Iv(Rumax, Qumax). Thus, the deterioration in quality of the animation is estimated, in the case of the replacement of the reference image by the enlarged image Iv(Rumax, Q).

This estimation is for example the mean square deviation between the two images. At step S311, the result Dist(Iv(R, Q)) of the estimation is stored in the table T associated with list L (FIG. 12).

The following step S312 is a test to determine if the current quality Q is strictly less than the value Qumax. If the response is positive, that step is followed by the step S313 at which the quality Q is incremented by one unit. Step S313 is followed by the previously described step S306.

If the response is negative at step S312, that step is followed by the step S314, which is a test to determine if the current resolution R is strictly less than the value Rumax. If the response is positive, that step is followed by step S315 at which the resolution R is incremented by one unit and the current quality Q is set to the value zero. Step S315 is followed by the previously described step S306.

If the response is negative at step S314, then all the possible versions of the image considered of list L have been determined.

This treatment is repeated for all the images of the list L.

Figure 14:
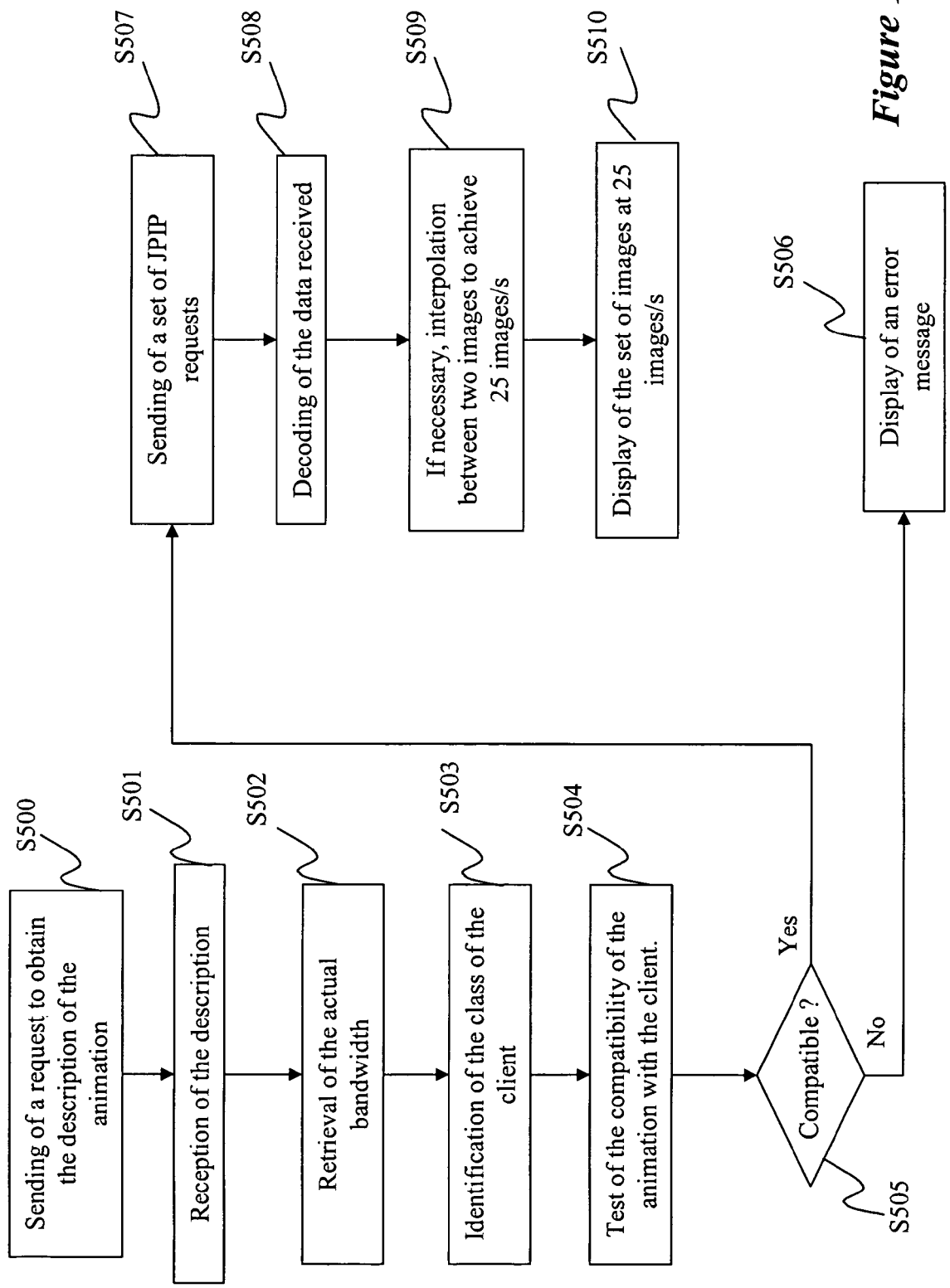
FIG. 14 represents a second embodiment of an animation downloading method according to the invention.

FIG. 14 represents a second embodiment of a method of downloading an animation, according to the invention. This method is implemented in the client terminal 2 and comprises steps S500 to S510.

The method is carried out in the form of an algorithm which can be stored in whole or in part in any means of information storage capable of cooperating with the microprocessor. This storage means is readable by a computer or by a microprocessor. The storage means may or may not be integrated into the device, and may be removable. For example, it may comprise a magnetic tape, a diskette or a CD-ROM (fixed memory compact disk).

Step S500 is the sending of a request to the server to obtain the description file of the animation.

The following step S501 is the reception of the description file.

The following step S502 is the retrieval of the actual bandwidth of the client terminal 2. This operation is performed either on the basis of a configuration file, or on request by the user through a graphical interface.

The following step S503 is the identification of the class of the client terminal on the basis of the description of the animation and according to its bandwidth. The versions of the keyframes corresponding to the class of the client terminal are selected.

The following step S504 is a test of compatibility of the animation with the client terminal. If the client terminal does not have sufficient bandwidth for the animation, a logic variable COMP is set to the value "false". Otherwise, that variable is set to the value "true".

The following step S505 is a test of the value of the logic variable COMP.

If it indicates an incompatibility, that step is followed by the step S506 which is the display of an error message.

It there is compatibility at step S505, that step is followed by the step S507 which is the sending out of the JPIP requests corresponding to the class determined previously.

The following step S508 is the reception and decoding of the data received in response to the requests sent out.

The following step S509 is an interpolation between the keyframes received, if it is necessary in order to be able to play the animation at 25 images per second.

The following step S510 is the display of the animation at a frequency of 25 images per second on the client terminal.

A third non-limiting example of the invention will now be described with reference to FIGS. 15 to 20 in its application to an animation formed from a fixed image to the standardized JPEG2000 format.

First of all certain basic concepts relating to manipulated data are stated, firstly in accordance with the JPEG2000 standard and secondly in accordance with the JPIP protocol (JPEG2000 Internet Protocol).

In the JPEG2000 standard, a file is composed of an optional JPEG2000 preamble, and a codestream comprising a main header and at least one tile.

A tile represents in a compressed fashion a rectangular part of the original image in question. Each tile is formed by a tile header and a compressed set of image data referred to as the tile bitstream.

Each tile bitstream comprises a sequence of packets. Each packet contains a header and a body. The body of a packet contains at least one code block which, as indicated above, is a compressed representation of an elementary rectangular part of a tile, possibly converted into sub-bands. The header of each packet summarizes firstly the list of code blocks contained in the body in question and secondly contains compression parameters peculiar to each of these code blocks. Each code block is compressed on several incremental quality levels: a base layer and refinement layers. Each quality level or layer of a code block is contained in a distinct packet.

A packet of a tile bitstream of a JPEG2000 file therefore contains a set of code blocks corresponding to a given tile, component, resolution level, quality level and spatial position (also referred to as a "precinct").

The codestream portion corresponding to a tile can be divided into several contiguous segments called tile parts. In other words, a tile contains at least one tile part. A tile part contains a header (the tile-part header) and a sequence of packets. The division into tile parts is carried out at boundaries between packets.

The JPIP protocol makes it possible to transfer JPEG2000 file parts. Various classes of entities of a JPEG2000 file, also referred to as "data-bin", are provided for by the future JPIP standard:
meta data-bin: consists of the series of consecutive bytes in the byte range contributing to a given set of meta-information on a compressed JPEG2000 image;

main header data-bin: consists of the series of consecutive bytes of the initial JPEG2000 bitstream contributing to the main header of the JPEG2000 file;

tile header data-bin: consists of the series of consecutive bytes of the initial JPEG2000 bitstream contributing to a tile header of the original JPEG2000 image;

precinct data-bin: in JPIP terminology, a precinct consists of all the packets in the various quality layers of the image which correspond to the same spatial position;

tile data-bin: consists of a series of consecutive bytes contributing to the same tile part.

Each class has a unique identifier "Class-Id". A JPIP response consists of a header paragraph in accordance with the HTTP protocol, followed by a series of JPIP messages or data-bin increments. Each response message consists of a series of consecutive bytes each contributing incrementally to a given data-bin. It consists of a header and a body. The header of a message contains the following fields: "Bin-Id", "[,Class]", "[, Csn]", "Msg-Offset", "Msg-Length" and "[, Aux]".

The purpose of the fields Bin-Id, [,Class] and [, Csn] is to identify uniquely the data-bin to which the message in question contributes. They transport the following three items of information:

the index of the codestream to which the data-bin belongs, in the case where the initial JPEG2000 file contains several codestreams;

the identifier of the class (Class-Id) of the data-bin in question;

the identifier of the data-bin within the class to which it belongs or "In-Class-Id".

The fields Msg-Offset and Msg-Length which follow in the header of the message indicate which are the bytes transported by the useful data contained in the JPIP message. This is because the data-bin identified by the start of the header corresponds to a data segment contained in the initial JPEG2000 file. The field Msg-Offset indicates the position of the first byte, in the data-bin in question, of the data part of this data-bin transported in the body of the message. The field Msg-Length indicates the number of bytes of useful data, extracted from the data-bin in question from the position Msg-Offset and transported in the body of the JPIP message.

Finally, the body of each message consists of a portion of Msg-Length bytes of the useful data. This data portion is extracted from the original JPEG2000 bitstream and corresponds to the series of consecutive bytes of the bitstream (Msg-Offset, Msg-length) specified in the header of the message.

The image data requests, according to the JPIP protocol, consist of several types of field:

the display window fields indicate to the server the current interest area required by the client. These fields include in particular the resolution level of the image associated with the area, the position of the window in the image, the size of the window (height and width), and the components of the image included in the area of interest. In addition, the future JPIP standard provides for several optional parameters, useful for controlling the quantity of data contained in the response from the server. These parameters may limit the maximum number of useful data bytes to be returned for the area in question, the maximum number of quality layers to be returned or the image quality factor to be satisfied for the area of interest;

fields relating to the cache of the client supply to the server information relating to the cache of the client sending the request:

model=<model-elements>

This instruction indicates to the server how to update the cache model which it is maintaining for a given client, within a given session. Each entity in the character string "model-elements" indicates, according to a syntax defined by JPIP, a cache element of the client, possibly preceded by the minus sign '−'. The elements preceded by '−' indicate entities which the client has removed from his cache. The others are additive and indicate entities which the client possesses and has stored in his cache. This type of instruction is valid both:

for a so-called "stateful" server, that is to say one which maintains a model of the client cache at the same time as it transmits data to it during a JPIP session, and for a so-called "stateless" server, that is to say one which maintains no client cache model between two JPIP requests.

need=<bin-descriptors>

This instruction indicates to the server that only the increments indicated, and pertinent vis-à-vis the area of interest, form part of the request from the client. This instruction applies solely to a so-called "stateless" server.

It is assumed here that the data are transferred from the server to the client in the form of header data (meta-data, main header and tile header) and compressed data in the form of precinct increments. In other words, this is a particular non-limiting case where the JPIP data returned from the server to the client are in accordance with the JPP-STREAM media type.

Figure 15:
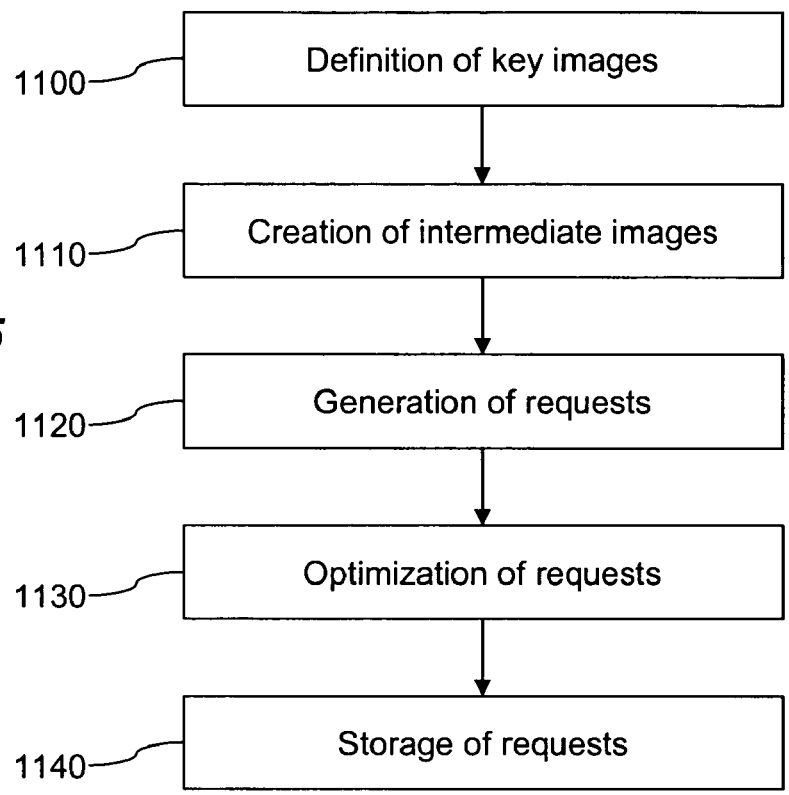
FIG. 15 is a flow diagram illustrating, in a further embodiment of the invention, the main steps of the creation of an animation from an image.

The flow diagram in FIG. 15 illustrates the main steps implemented by the invention for the production of an animation from an image and the preparation of its transmission from a server to a client or user according to the third embodiment.

The designer of an animation commences by defining the animation by a certain number of images, referred to as key images (step 1100). These key images define the state of the animation, that is to say what the user of the animation will see, at certain moments determined by the designer. The designer also defines transitions between these key images. This step is detailed below in relation to FIG. 16.

Next all the images in the animation are calculated from these key images and the transitions between them, by interpolation of these key images (step 1110). More details on this step are given in the description of FIG. 16.

Then it is determined, for each image in the animation, what are the data necessary for being able to display this image. From the result of this determination, requests are generated (step 1120) making it possible to obtain these data from a JPEG2000 file using the JPIP protocol (see below the description of FIG. 18).

The requests thus generated are not optimal with respect to the quantity of data transferred in order to be able to read the animation. Thus it is sought to optimise these requests (step 1130). First of all, there are removed from each request the data already obtained by a previous request, by eliminating the empty requests in passing (see below the description of FIG. 5). Then certain requests requesting a larger set of data than the others are divided and these divided requests are reordered so that the quantity of data requested during time for displaying the animation undergoes only a few variations (see below the description of FIG. 20).

Finally, these optimised requests are stored (step 1140) in a file. This file can be stored, with the initial JPEG2000 file, in a server computer in order to offer the animation to users. In order to be able to display the animation, a user will have first of all to download the file containing the optimised requests. Next he will execute these optimised requests on the server. In response to these requests, the server will transmit the data necessary for the display of the animation by extracting them from the initial JPEG2000 file.

Advantageously, when a user requests the optimised request file, the server computer can transmit this file to him simultaneously as well as the data corresponding to the result of the animation initialization request (see below).

Figure 16:
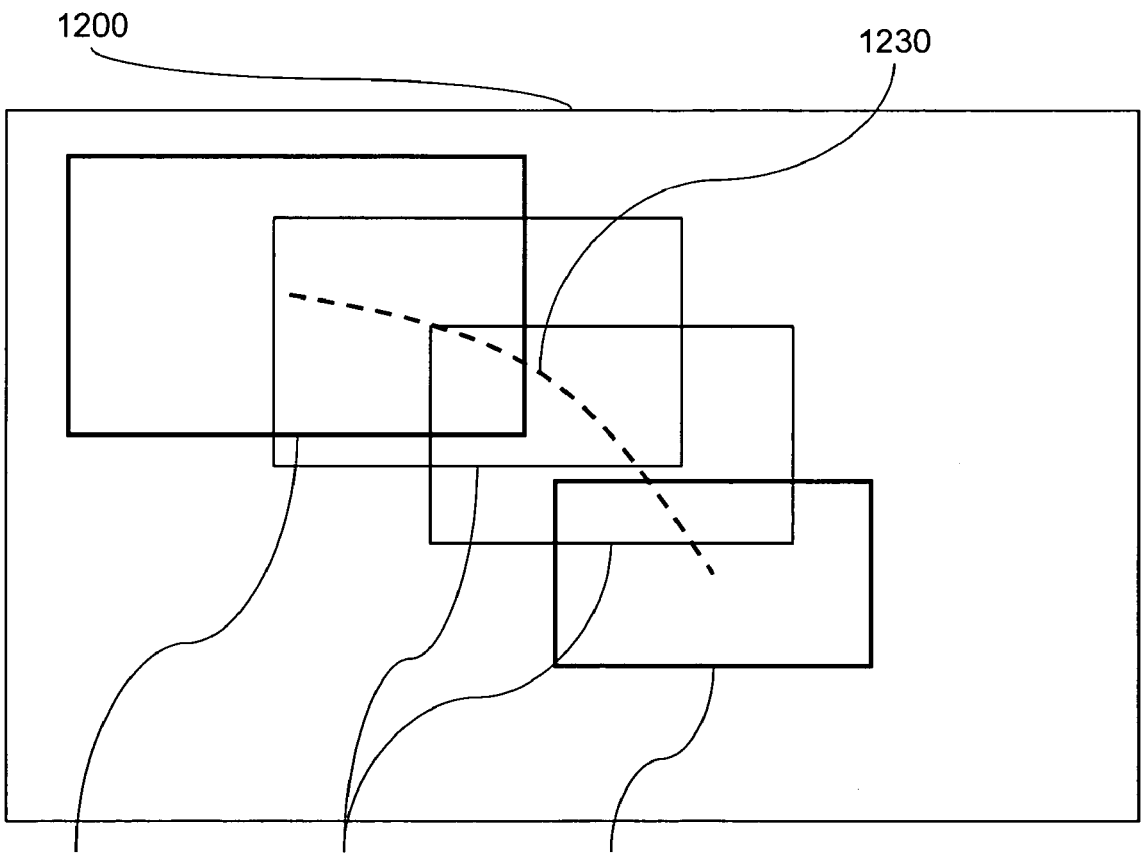
FIG. 16 details schematically the steps of definition of key images and creation of intermediate images illustrated in FIG. 15.

FIG. 16 illustrates more precisely how the designer creates an animation.

Firstly the designer chooses a fixed image 1200 which will serve as a basis for his animation. This image is stored in a file to the JPEG2000 format.

He next defines a first key image 1210 for his animation. This first key image will be the first image seen by a user playing the animation. The designer will define a set of characteristics for this first key image. These characteristics can be stored in a table Ta of the type depicted in FIG. 17. These characteristics are for example:

- the outline of the image seen by the user. This outline may be a rectangle as shown in FIG. 16 or any other shape, such as a circle, star etc. This shape can be defined vectorially or using a mask of the bitmap type, known to persons skilled in the art;
- the resolution of the image. This resolution corresponds to one of the resolutions proposed in the JPEG2000 file containing the initial fixed image;
- the quality required for the image. This quality corresponds to one of the quality levels proposed by the JPEG2000 file containing the initial fixed image, the rate (in bits per pixel, or bpp) or a standardized quality factor (represented by a value from 0 to 100).

Other characteristics can be specified for this image. For example, the definition of the outline can be supplemented by the definition of a display angle, thus making it possible to present an image which has undergone a rotation with respect to the initial fixed image. It is also possible to apply special effects to the image, for example a filter. These other characteristics are not taken into account in the creation of the requests for obtaining the data necessary for displaying the image, but will be stored in the file describing the animation. Adding these additional characteristics enables the designer to produce richer animations.

The designer defines in the same way a second key image 1220, which will be the last image in the animation. For this second key image, the designer can also define the time of display of this image, that is to say the time which elapses between the previous image (first image, which serves as a reference for measuring the duration of the animation) and this image. The resulting animation will change from the first image to this second image in a time corresponding to the duration separating the dates of the two images.

To specify the change between the two images, the designer defines a path 1230, which connects the center of the first key image to the center of the second key image. The centers of the various images which will form the animation between these two key images will also be situated on this path.

From these elements, intermediate images 1240 are calculated, which, with the key images, will form all the images of the animation. These intermediate images are calculated by interpolation between the two key images.

In order to produce more complex animations, it is possible to define more than two key images. Each additional key image must be associated with a date in the duration of the animation and participates in the definition of two parts of the animation: the part which commences with the preceding key image and terminates with the additional key image, and the part which commences with the additional key image and terminates with the following key image.

In addition, depending on the number of key images available, the designer can opt for a linear interpolation or for an interpolation using more complex algorithms (bilinear or trilinear interpolation), known to persons skilled in the art.

Figure 17:
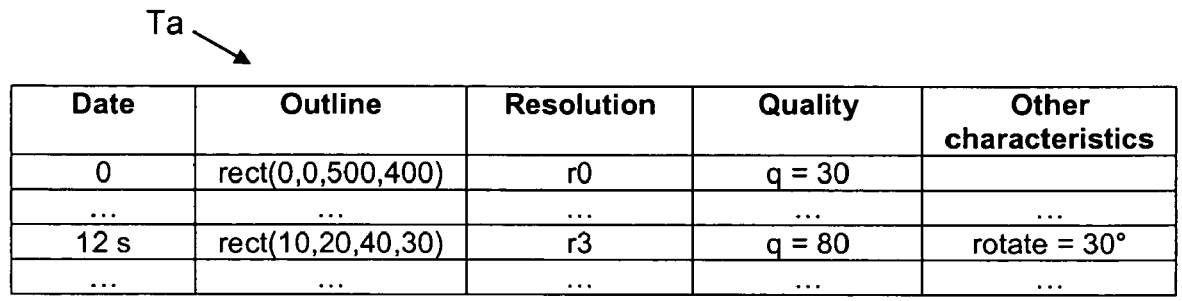
FIG. 17 is an example of a table serving to store characteristics of the images belonging to the animation created and transmitted in accordance with the present invention.

FIG. 17 depicts an example of the table Ta serving to store the characteristics of each of the images.

The first column comprises the date corresponding to the place of the image in the sequence. This date can for example be initialized to zero at the start of the sequence and then expressed in seconds. Thus the characteristics stored in the third line of the table concern an image situated at 12 seconds from the start of the sequence.

The second column contains a description of the outline of the image. In the example in FIG. 17, the outline is a rectangle, designated by "rect" in the table Ta. The four numbers between parentheses after "rect" correspond to coordinates (in pixels) in the image 1200.

The third column contains the resolution to be used for the image. Thus r0 and r3 designate two of the resolutions proposed by the JPEG2000 file containing the initial fixed image.

The fourth column contains the quality required for the image, the variable q being a standard quality factor as mentioned above, whose value is between 0 and 100.

The fifth column contains all the additional characteristics for the image (for example "rotate=30°" designates a rotation through an angle of 30 degrees for the image situated at 12 seconds from the start of the sequence).

At the start, the table Ta is created empty, without any lines. Then, when the designer defines the duration of the animation and the number of images required per second, one line is created for each image.

Each time the designer defines a key image, the characteristics of this key image are stored in the table Ta at the line corresponding to the date of the image.

Then, when the designer has defined all the key images, the other images are created by interpolation. For a given image, the value of each characteristic is calculated by interpolation from the values of this characteristic for the previous key image and for the following key image.

It is necessary to make a coherent interpolation of the various characteristics, taking account of the fact that the values of several characteristics may be linked together. For example, for each resolution of a JPEG2000 image, there exist several quality levels. The interpolation of the quality level is therefore dependent on the interpolation of the resolution. Thus the interpolation algorithm must take into account the link between these two characteristics in order to interpolate them coherently.

Figure 18:
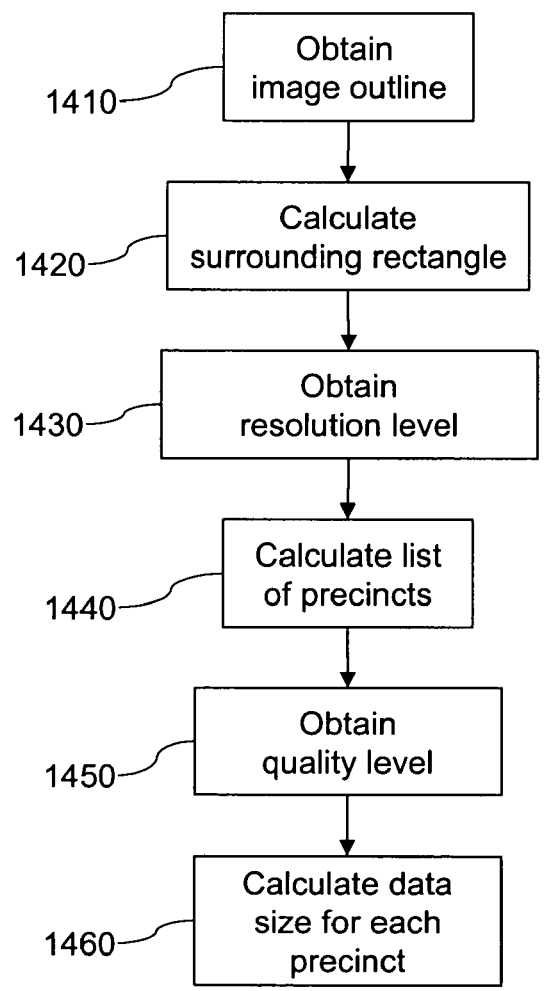
FIG. 18 is a flow diagram detailing the request generation step depicted in FIG. 15.

The flow diagram in FIG. 18 illustrates the generation of a JPIP request making it possible to obtain all the data necessary for the display of an image, whether this be a key image or an intermediate image.

The first step 1410 of this algorithm consists of obtaining the outline of the image from the table Ta. In the case of a key image, the outline of the image has been defined directly by the designer, whilst in the case of an intermediate image the outline of the image is obtained by interpolation of the outlines of the key images preceding and following this intermediate image (cf. FIG. 15, step 1110).

As the outline of the image is not necessarily rectangular, the algorithm next calculates (step 1420) the rectangle surrounding the image. Then it obtains the resolution level of the image (step 1430) from the table Ta.

The rectangle surrounding the image and the required resolution level make it possible to calculate the list of the precincts containing the data constituting the image (step 1440).

The algorithm then obtains the quality level required for this image (step 1450) and determines, for each of the precincts previously obtained, the data necessary for displaying the image according to the requirements of the designer (step 1460). More precisely, the algorithm calculates for each precinct the size of the data which will be used in this precinct.

The surrounding rectangle, the list of precincts and the quality level constitute all the information for generating a JPIP request returning all the information necessary for the display of the image.

Figure 19:
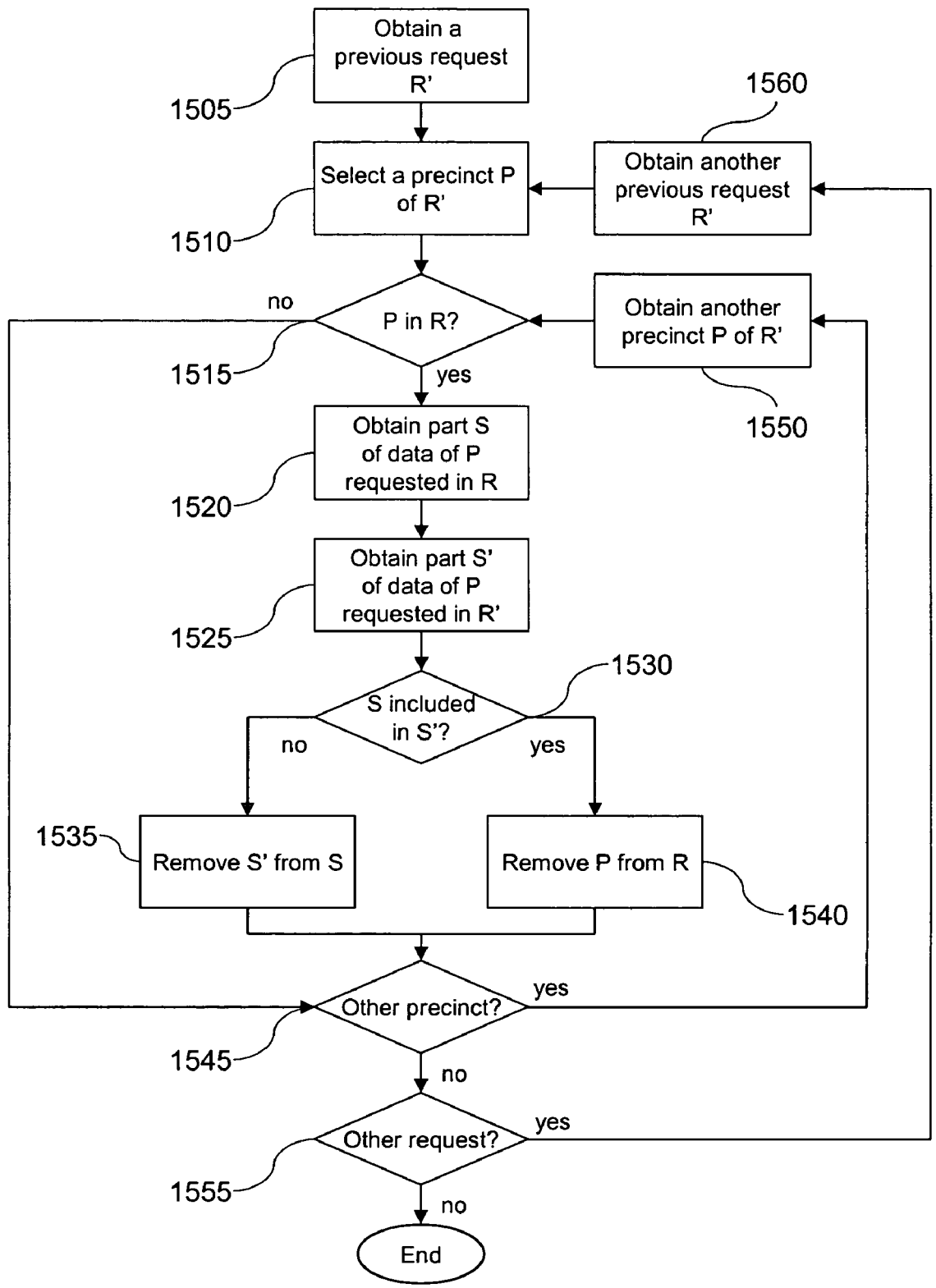
FIG. 19 is a flow diagram detailing a first part of the request optimisation step depicted in FIG. 15.

The flow diagram in FIG. 19 illustrates a first part of the step 1130 of optimising the requests depicted in FIG. 15. This first part consists of simplifying the various image data requests, by eliminating the redundancies in these requests.

This algorithm is applied successively to all the requests generated for the animation. When it is applied to a request R, the algorithm commences by selecting one of the previous requests R' (step 1505) and then selecting a precinct P contained in this request R' (step 1510). If this precinct is also in R (test 1515), the algorithm obtains the part S of the data of P requested in the request R (step 1520) and the part S' of the data of P requested in the request R' (step 1525). This is because, as the customer will already have made the request R' and obtained its result before making the request R, it is not necessary to re-request in R data already requested in R'.

If all the data of P requested in the request R are included in all the data of P requested in the request R' (test 1530), then it is not necessary to request data of the precinct P in the request R. This precinct P is therefore eliminated from R (step 1540); in the contrary case, the data of P already obtained by the request R' are eliminated from those requested in the request R (step 1535).

In both cases, and in the case where the precinct P is not contained in R (test 1515), the algorithm checks whether other precincts in R' exist (test 1545). If such is the case, it selects another precinct (step 1550) and executes the steps 1515 to 1545 for this new precinct.

If there is no other precinct in R', then the algorithm checks whether other requests preceding the request R exist (test 1555). If such is the case, it selects another preceding request (step 1560) and executes the steps 1510 to 1555 for this new request. If such is not the case, the algorithm is terminated for the request R.

A variant for this algorithm consists of constructing, as the requests R are run through, a virtual cache model representing all the data already requested by one of the requests of the animation. A new request is then compared not with all the requests R' preceding it, but with the content of the virtual cache.

Figure 20:
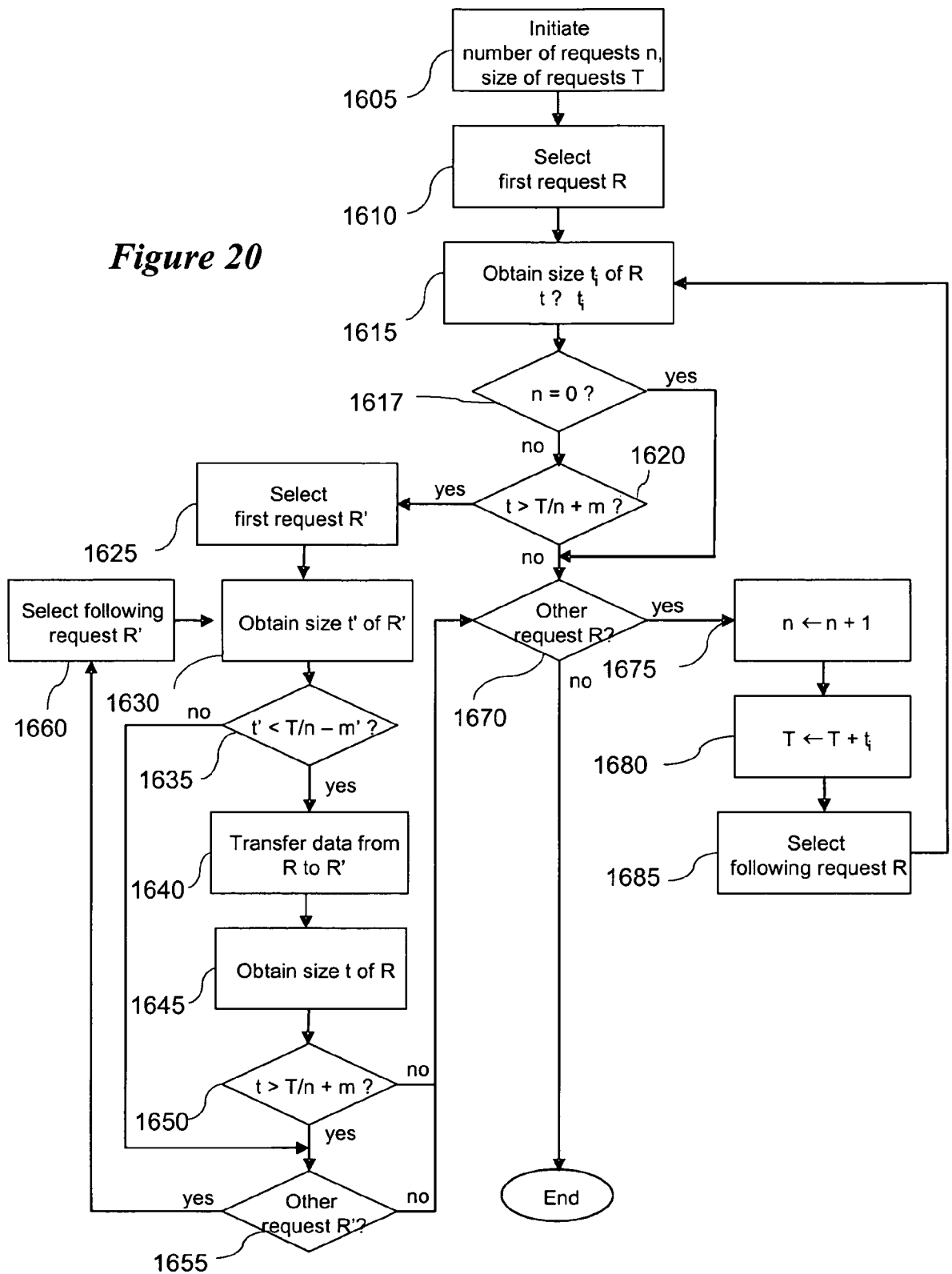
FIG. 20 is a flow diagram detailing a second part of the request optimisation step depicted in FIG. 15.

The flow diagram in FIG. 20 illustrates a second part of the request optimisation step 1130 depicted in FIG. 15. This second part consists of "equalizing" the various requests, that is to say distributing the data requested by the various requests so that the responses to these requests have similar sizes. This makes it possible to have a constant bandwidth demand throughout the animation and avoids any jolts which may arise if certain requests request a quantity of data appreciably greater than that requested by the other requests.

The algorithm begins by initializing two variables: the number n of requests processed and the total size T of the data requested by these requests. These two variables are initialized to 0 (step 1605).

Then the algorithm selects a first request R (step 1610). It also calculates the initial size ti of the data requested by this request and initializes to the value of this variable ti a variable t representing the size of the data requested by the request R (step 1615).

Next it checks whether the size t of the data requested by the request R is appreciably greater than the mean size of the data requested by the other requests (test 1620). This mean size is obtained by dividing the total size T of the data requested by the requests already processed, by the number n of these requests already processed. To this quotient there is added a predefined value m which represents the accepted variability for the size of the data requested by the various requests. Thus it is considered that the size t of the data requested by R is appreciably greater than the mean size T/n when t>T/n+m. It is in fact not necessary for the sizes of the data requested by the various requests to all be strictly identical.

When the first request R is processed, that is to say for the case n=0 (test 1617 positive), test 1670, described below, is passed to directly from step 1615.

If the request R processed is not the first request (test 1617 negative), test 1620 is proceeded with and, if this is positive, that is to say the size t of the data requested by the request R is appreciably greater than the mean size of the data requested by the other requests, then the algorithm will attempt to move some of the data requested by the request R to previous requests requesting fewer data. For this, it selects a request R' preceding R (step 1625) and then calculates the size t' of the data requested by this request R' (step 1630).

This size t' is then compared with the mean size of the data requested by the requests (test 1635) in order to check whether it is appreciably less than this mean size. For this purpose, the size t' is compared with the total size T of the data requested by the requests already processed, divided by the number n of these requests already processed, this quotient being reduced by a predefined value m' which makes it possible not to take into account requests where the size of the data requested is close to the mean size of the data requested. It should be noted that, for correct functioning of the algorithm, it is necessary to define jointly the values of m and m'. In particular, it is wise to choose m' less than or equal to m.

If test 1635 is positive, then the algorithm transfers some of the data requested by R to R' (step 1640). Advantageously, the quantity of data transferred from R to R' is such that the new size of R' does not exceed the mean size T/n, where T is the total size of the requests already processed and n is the number of requests already processed. Next the algorithm calculates the new size, t, of the data requested by R (step 1645).

If this new size is always appreciably greater than the mean size of the data requested by the other requests (test 1650, identical to test 1620), or if the size t' of the data requested by the request R' is not appreciably less than the mean size of the data requested (test 1635), the algorithm will continue to attempt to move some of the data requested by the request R. For this purpose, it checks whether there exist other requests preceding the request R (test 1655) and, if such is the case, selects one of these other requests, R' (step 1660). Then it once again applies steps 1630 to 1650 to this new request R'.

If one of the tests 1620, 1650 or 1655 is negative, then the algorithm stops the processing of the request R (whether or not it has been conclusive) and processes the following request. For this purpose it checks (test 1670) whether other unprocessed requests exist. If such is not the case, the algorithm ends; otherwise the algorithm updates the number n of requests processed (step 1675), the total size T of the data requested by the requests processed, by adding the size ti (step 1680), and then selects the following request R (step 1685). It then once again applies steps 1615 to 1670 to this new request R.

Concerning the calculation of the mean size of the data requested by the various requests, in a variant, instead of calculating this mean size as the requests are processed, it is possible to calculate the mean size from all the requests, at the start of the algorithm, instead of step 1605. The mean size obtained then replaces the value of T/n in the tests 1620, 1635 and 1650 depicted in FIG. 20. This variant makes it possible to avoid reducing the size of a request which is larger than the previous ones and then increasing it when other requests of much greater size are processed, which may occur if the first requests request data of small size whilst the following ones request data of greater size.

Another variant also concerning the request equalization algorithm consists of creating an initialization request. The size of the data requested by the first request can often be much greater than the mean size of the data requested by the various requests. This is because the object of the first request is to obtain all the data necessary for the display of the first image in the sequence whilst the following requests request only the new data necessary for the display of the corresponding image. As the size of the data requested by this first request cannot by definition be reduced by transferring some of these data to previous requests, the succession of steps depicted in FIG. 20 does not make it possible to equalize this request.

To avoid the maximum bandwidth requested by the animation being made large because of this first request, it is possible to generate and execute an initialization request before the start of the animation. The mean size of the data requested by the various requests is then calculated on all the requests except for the first. If the size of the data requested by the first request is greater than this mean size, in a proportion defined by a predetermined value, the excess data are transferred to the initialization request.

In addition, in the algorithm in FIG. 20, if the test 1655 is negative, that is to say if the request currently being processed by the algorithm still has an excessively large size compared with the mean and if there is no previous request for some of these data to be transferred to, it is then possible to transfer these excess data in the initialization request.

Another variant concerns the step 1140 of storing the requests, illustrated in FIG. 15. In addition to each request, it is possible to store information indicating the precincts which will not be used in the remainder of the animation. Thus a client wishing to economize in memory which he is using can remove from this memory the data corresponding to precincts not used in the remainder of the animation. This enables the destination client for the animation to avoid storing all the data received coming from the server until the end of reception of the animation.

Of course, the present invention is in no way limited to the embodiments described and represented, but encompasses, on the contrary, any variant form within the capability of the person skilled in the art. In particular, the various embodiments may be combined.

What is claimed is:

1. A method of creating an animation comprising a sequence of images from at least one encoded fixed image, including the steps of:
   optimising, depending on at least one criterion, requests to be sent from a client terminal to a remote terminal containing said at least one fixed image, said requests allowing retrieval of encoded data representing images of the animation; and
   creating a file comprising the optimised requests,
   wherein the animation consists of a sequence of fixed images, and further comprising steps of:
   defining the animation from a fixed image; and
   generating said requests as requests to obtain data necessary for displaying the images,
   wherein the animation definition step comprises a substep of defining a plurality of key images and a plurality of transitions between the key images,
   wherein the substep of defining a plurality of key images and transitions comprises the definition of a plurality of characteristics for each key image, amongst which there may be found the date of display of the image in the sequence, the outline, the resolution and the required quality, and
   wherein the substep of defining a plurality of key images and transitions comprises the definition of a path connecting the centres of the key images.

2. A method of creating an animation comprising a sequence of images from at least one encoded fixed image, including the steps of:
   optimising, depending on at least one criterion, requests to be sent from a client terminal to a remote terminal containing said at least one fixed image, said requests allowing retrieval of encoded data representing images of the animation; and
   creating a file comprising the optimised requests,
   wherein the animation consists of a sequence of fixed images, and further comprising steps of:
   defining the animation from a fixed image; and
   generating said requests as requests to obtain data necessary for displaying the images, and
   wherein the request optimisation step comprises a substep consisting of distributing between the various requests the data requested by said requests so that the sizes of the data requested by said requests are similar.

3. A method according to claim 2, wherein the distribution substep takes into account, for each request, the mean size of the data requested by the other requests.

4. A method according to claim 3, wherein, if the size of the data requested by a request exceeds said mean size by a predetermined value, the mean size is calculated without taking account of the size of the data requested by this step and the request optimisation step also comprises a substep of creating an initialisation request, intended to request the excess data coming from this request.

5. A method of downloading an animation from a server to a client terminal, the animation comprising a sequence of images from at least one encoded fixed image formed by a method including the steps of:
   optimising, depending on at least one criterion, requests to be sent from a client terminal to a remote terminal containing said at least one fixed image, said requests allowing retrieval of encoded data representing images of the animation; and
   creating a file comprising the optimised requests,
   wherein the animation comprises keyframes, wherein the step of optimising requests include a step of determining a plurality of versions of the animation depending on said criterion, said criterion corresponding to at least one characteristic of the client liable to download the animation, and wherein said file comprises a description of the different versions determined and their associated criterion,
   wherein said downloading method comprises the steps of:
   receiving the description of the different versions of the animation,
   selecting a version of the animation depending on at least one characteristic of the client terminal, and
   sending out requests depending on the version selected, and
   wherein the selecting step comprises the steps of:
   determining a level of priority of the animation depending on the overall decoding cost of the keyframes of each level of priority and on the processing capacities of the client terminal,
   selecting the keyframes belonging to the level of priority determined.

* * * * *